(12) United States Patent
Park et al.

(10) Patent No.: US 12,621,580 B2
(45) Date of Patent: May 5, 2026

(54) IMAGE SENSOR AND ELECTRONIC DEVICE INCLUDING THE SAME

(71) Applicant: SAMSUNG ELECTRONICS CO., LTD., Suwon-si (KR)

(72) Inventors: Keunjoo Park, Suwon-si (KR); Mooyoung Kim, Suwon-si (KR); Junseok Kim, Suwon-si (KR); Junhyuk Park, Suwon-si (KR); Bongki Son, Suwon-si (KR); Jiwon Im, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 18/799,036

(22) Filed: Aug. 9, 2024

(65) Prior Publication Data

US 2025/0220316 A1      Jul. 3, 2025

(30) Foreign Application Priority Data

Jan. 3, 2024      (KR) ........................ 10-2024-0000727

(51) Int. Cl.
*H04N 25/42*          (2023.01)
*H04N 25/46*          (2023.01)
*H04N 25/533*        (2023.01)

(52) U.S. Cl.
CPC ............. *H04N 25/42* (2023.01); *H04N 25/46* (2023.01); *H04N 25/533* (2023.01)

(58) Field of Classification Search
CPC ...... H04N 25/42; H04N 25/46; H04N 25/533; H04N 25/589; H04N 23/951; H04N 25/441; H04N 25/573
See application file for complete search history.

(56) References Cited

U.S. PATENT DOCUMENTS 5,973,311 A *  10/1999  Sauer ................... H04N 25/779
                                                            348/E3.018
8,624,992 B2 *  1/2014  Ota ....................... H04N 25/443
                                                            348/222.1

(Continued)

FOREIGN PATENT DOCUMENTS

JP          5372068 B2        12/2013
JP      2017-535999 A       11/2017

(Continued)

*Primary Examiner* — Chiawei Chen

(74) *Attorney, Agent, or Firm* — Sughrue Mion, PLLC

(57)          ABSTRACT

An image sensor includes a pixel array including a plurality of pixels arranged in a first direction and in a second direction; and a logic circuit configured to drive the plurality of pixels. The logic circuit is configured to: generate, based on pixel data corresponding to each of the plurality of pixels, first image data having a first resolution, after generating the first image data, to generate second image data having a second resolution based on binning pixel data corresponding to each of a plurality of binning pixels, the plurality of binning pixels binning two or more pixels adjacent to each other, among the plurality of pixels, the second resolution being lower than the first resolution; and output the first image data and the second image data. A first frames per second of the first image data is lower than a second frames per second of the second image data.

18 Claims, 21 Drawing Sheets

(56)                    References Cited

U.S. PATENT DOCUMENTS

| | | | | |
|---|---|---|---|---|
| 9,838,641 | B1 * | 12/2017 | Lim | H04N 23/65 |
| 10,225,511 | B1 * | 3/2019 | Lim | H04N 23/667 |
| 10,237,506 | B2 | 3/2019 | Park et al. | |
| 10,958,849 | B1 * | 3/2021 | Wang | H04N 23/65 |
| 11,140,349 | B2 | 10/2021 | Suh et al. | |
| 2009/0002504 | A1 * | 1/2009 | Yano | H04N 23/667 |
| | | | | 348/E5.042 |
| 2012/0293650 | A1 | 11/2012 | Murakami | |
| 2013/0021492 | A1 * | 1/2013 | Tatsuzawa | H04N 25/46 |
| | | | | 348/222.1 |
| 2014/0118588 | A1 * | 5/2014 | Puetter | H04N 25/585 |
| | | | | 348/300 |
| 2018/0367752 | A1 * | 12/2018 | Donsbach | H04N 23/667 |
| 2019/0253644 | A1 * | 8/2019 | Zhu | H04N 23/74 |
| 2019/0281235 | A1 * | 9/2019 | Breuer | H04N 23/55 |
| 2020/0358977 | A1 | 11/2020 | Niwa et al. | |
| 2021/0084246 | A1 | 3/2021 | Mostafalu et al. | |
| 2021/0134872 | A1 * | 5/2021 | Kim | H10F 39/813 |
| 2021/0152767 | A1 * | 5/2021 | Ma | H04N 25/78 |
| 2022/0060623 | A1 * | 2/2022 | Elizov | H04N 23/667 |
| 2022/0070391 | A1 * | 3/2022 | Duenyas | H04N 25/42 |
| 2022/0182565 | A1 * | 6/2022 | Kim | H04N 25/771 |
| 2022/0329726 | A1 * | 10/2022 | Cho | H04N 23/63 |
| 2023/0027452 | A1 * | 1/2023 | Powell | H04N 25/78 |
| 2023/0042364 | A1 | 2/2023 | Ye et al. | |
| 2023/0132809 | A1 * | 5/2023 | Kim | H04N 25/46 |
| | | | | 348/207.99 |
| 2023/0164433 | A1 * | 5/2023 | Nikhara | H04N 23/80 |
| | | | | 348/362 |
| 2023/0254469 | A1 * | 8/2023 | Shafer | H04N 13/239 |
| | | | | 348/47 |
| 2023/0283918 | A1 * | 9/2023 | Zhou | H10F 39/8053 |
| | | | | 348/301 |
| 2025/0045873 | A1 * | 2/2025 | Kundu | H04N 5/2226 |

FOREIGN PATENT DOCUMENTS

| | | | |
|---|---|---|---|
| KR | 10-2020-0112839 | A | 10/2020 |
| KR | 10-2022-0062283 | A | 5/2022 |
| WO | 2016/053795 | A9 | 4/2016 |
| WO | 2021/054183 | A1 | 3/2021 |

* cited by examiner

50

200

700    701

702    703

710    711

712    713

IMAGE SENSOR AND ELECTRONIC DEVICE INCLUDING THE SAME

CROSS-REFERENCE TO RELATED APPLICATION(S)

This application claims benefit of priority to Korean Patent Application No. 10-2024-0000727 filed on Jan. 3, 2024 in the Korean Intellectual Property Office, the disclosure of which is incorporated herein by reference in its entirety.

BACKGROUND

One or more example embodiments of the disclosure relate to an image sensor and an electronic device including the same.

Image sensors may not only image a subject to generate a two-dimensional image but also be applied in a variety of fields to measure a distance to the subject or generate a three-dimensional image. In particular, in recent years, research has been actively conducted to implement a function of capturing an image by imaging a subject and a function of tracking movement of the subject or measuring a distance to the subject with a single image sensor.

SUMMARY

One or more example embodiments of the disclosure provide an image sensor capable of generating image data of different resolutions and different numbers of frames per second from a single pixel array, thereby outputting a video having a high resolution and a high frames per second, or reducing shaking of a subject, and an electronic device including the same.

According to an aspect of an example embodiment of the disclosure, there is provided an image sensor including: a pixel array including a plurality of pixels arranged in a first direction and in a second direction, the second direction intersecting the first direction; and a logic circuit configured to drive the plurality of pixels, wherein the logic circuit is further configured to: generate, based on pixel data corresponding to each of the plurality of pixels, first image data having a first resolution, after generating the first image data, to generate second image data having a second resolution based on binning pixel data corresponding to each of a plurality of binning pixels, the plurality of binning pixels binning two or more pixels adjacent to each other, among the plurality of pixels, the second resolution being lower than the first resolution; and output the first image data and the second image data, and wherein a first frames per second of the first image data is lower than a second frames per second of the second image data.

According to an aspect of an example embodiment of the disclosure, there is provided an electronic device including: an image sensor configured to sequentially output first image data having a first resolution and second image data having a second resolution, the second resolution being lower than the first resolution; and a processor configured to output a result image using the first image data and the second image data, wherein the image sensor includes a pixel array, the pixel array including a plurality of pixels having a same structure, and wherein the image sensor is further configured to, based on pixel data obtained from each of the plurality of pixels exposed to a light for a first exposure time, generate the first image data, and based on binning pixel data obtained from each of a plurality of binning pixels binning two or more pixels adjacent to each other, among the plurality of pixels, exposed to a light for a second exposure time, shorter than the first exposure time, to generate the second image data.

According to an aspect of an example embodiment of the disclosure, there is provided a processor including: an interface configured to receive image data from an image sensor; and an image signal processor configured to process the image data to generate a result image, wherein the interface is configured to receive first image data having a first resolution and a first frames per second, and second image data having a second resolution and a second frames per second, wherein the first resolution is higher than the second resolution, and the first frames per second is slower than the second frames per second, and wherein the image signal processor is configured to process the first image data using the second image data, to generate the result image.

BRIEF DESCRIPTION OF DRAWINGS

The above and other aspects, features, and advantages of certain example embodiments of the disclosure will be more clearly understood from the following detailed description, taken in conjunction with the accompanying drawings, in which.

DETAILED DESCRIPTION

Hereinafter, example embodiments of the disclosure will be described with reference to the attached drawings.

Figure 1:
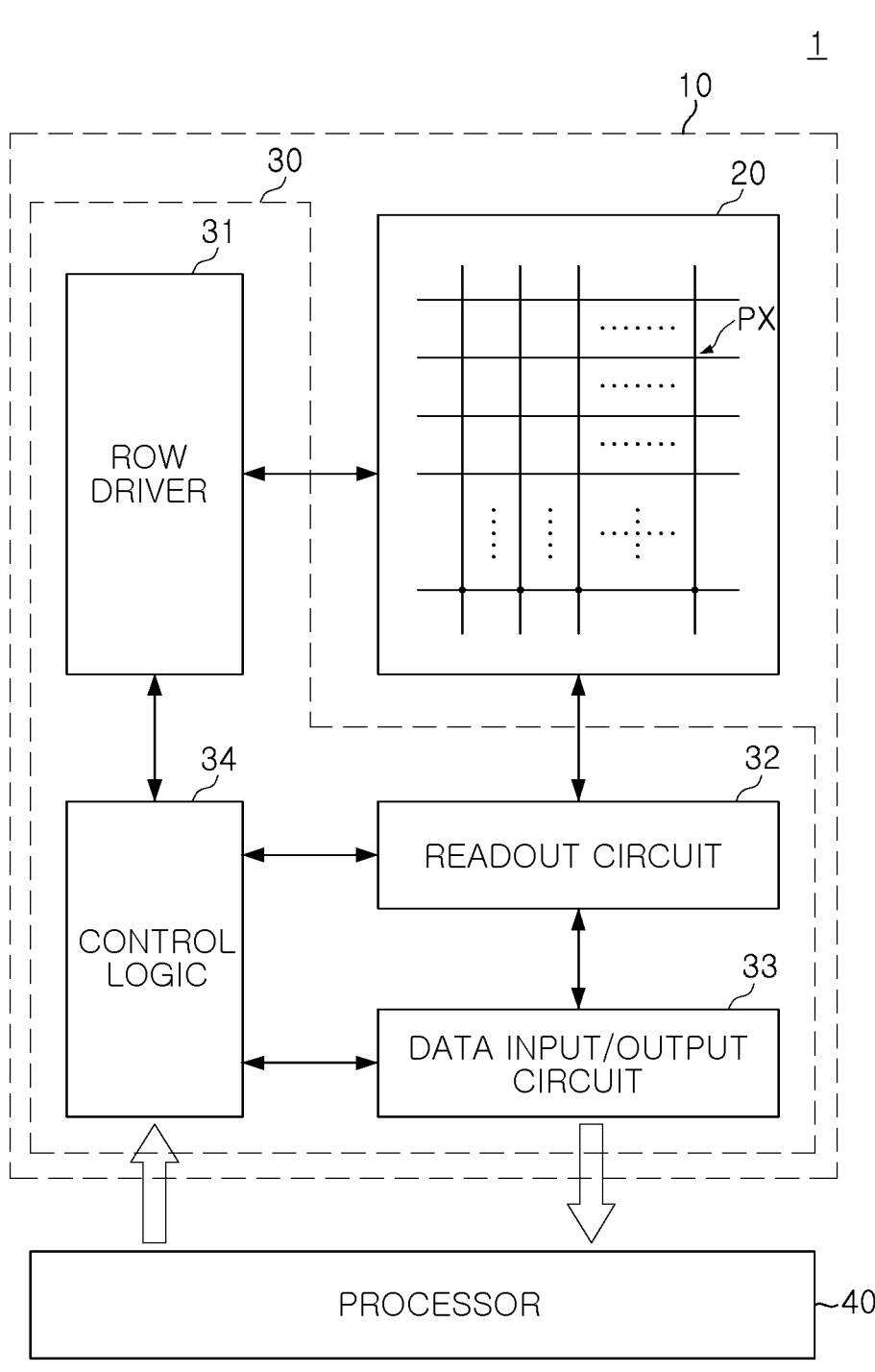
FIG. 1 is a block diagram schematically illustrating an electronic device including an image sensor according to one or more example embodiments.

FIG. 1 is a block diagram schematically illustrating an electronic device including an image sensor according to one or more example embodiments.

Referring to FIG. 1, an electronic device 1 may include an image sensor 10 and a processor 40. The image sensor 10 may include a pixel array 20 and a peripheral circuit 30, and in the pixel array 20, a plurality of pixels PX may be arranged in an array form along a plurality of rows and a plurality of columns. The plurality of pixels PX may have the same structure. Each of the plurality of pixels PX may include at least one photoelectric conversion element that generates charge in response to incident light. The photoelectric conversion element may be a photodiode.

In addition to the photodiode, each of the plurality of pixels PX may further include a pixel circuit that converts charges generated by light incident on the photodiode into an electrical signal. In an embodiment, the pixel circuit may include a plurality of transistors, and depending on an embodiment, two or more pixels adjacent to each other may share some of the plurality of transistors. A configuration and an operation of the pixel circuit will be described later.

The peripheral circuit 30 may include circuits that control the pixel array 20. For example, the peripheral circuit 30 may include a row driver 31, a readout circuit 32, a data output circuit 33, a control logic 34, and the like. The row driver 31 may simultaneously drive at least a portion of the plurality of pixels PX arranged in the pixel array 20. For example, the row driver 31 may provide a predetermined control signal to a portion of transistors included in respective selected pixels arranged along a selected row line.

The readout circuit 32 may be connected to the pixels through column lines. The readout circuit 32 may read a pixel signal from selected pixels, which receive the control signal from the row driver 31, through the column lines. In an embodiment, the pixel signal may correspond to a difference between a reset voltage and a pixel voltage, detected at each of the selected pixels. For example, the readout circuit 32 may convert the pixel signal into a digital signal to generate pixel data.

The pixel data generated by the readout circuit 32 may be transmitted to the data output circuit 33, and the data output circuit 33 may output image data including the pixel data through a predetermined interface. For example, the data output circuit 33 may transmit the image data to the processor 40. The processor 40 may include an image signal processor (ISP) that receives the image data and generates a resultant image to be output to a user, in addition to a central processing unit, a graphics processing unit, and a power unit. Depending on an embodiment, the image signal processor may not be included in the processor 40, but may be packaged together with the image sensor 10.

The control logic 34 may include a timing controller for controlling operation timing of the row driver 31, the readout circuit 32, and the data output circuit 33, or the like. Depending on an embodiment, the image sensor 10 may further include a memory that stores the image data, and in this case, the control logic 34 may include a circuit that controls the memory. For example, the memory may be implemented as a dynamic random access memory (DRAM), a static random access memory (SRAM), or the like.

In an embodiment, the image sensor 10 may generate image data having different resolutions. For example, the image sensor 10 may generate first image data including pixel data obtained from each of the plurality of pixels PX, and second image data including binning pixel data respectively obtained from a plurality of binning pixels defined by binning two or more of the plurality of pixels PX. A first resolution of the first image data may be higher than a second resolution of the second image data. Depending on an embodiment, the first image data may be RGB image data, and the second image data may be black and white image data.

The first image data having a relatively high resolution may inevitably have a limit in frames per second (fps). Therefore, when a resultant image in a video format is generated from the first image data, a resultant image having a high resolution may be output, but the frames per second of the resultant image may be limited. Since the second image data may be generated by a binning pixel signal obtained from the plurality of binning pixels, the second image data may have a lower resolution, and may increase the frames per second, as compared to the first image data.

In an embodiment, the second image data having a lower resolution but a higher frames per second may be generated, as compared to the first image data, and the second image data may be processed to reduce a number of bits of binning pixel data corresponding to each of the plurality of binning pixels. For example, among frames included in the second image data, a difference between binning pixel data respectively included in a pair of frames output continuously may be calculated, and the calculated difference may be compared with a threshold value to reduce the number of bits of the binning pixel data.

For example, an image signal processor that has received the first image data and the second image data may up-convert the frames per second of the first image data in a video format using the second image data. Alternatively, a quality of the first image data may be improved by deblurring the first image data in a still image format with reference to the second image data.

In the first image data having a high resolution, a number of bits of each pixel data may be relatively large, and therefore, a bandwidth required to output the first image data may be greater than a bandwidth required to output the second image data. In an embodiment, as described above, the number of bits of binning pixel data included in the second image data may be reduced to minimize an increase in a bandwidth required to output the first image data and the second image data. Additionally, a memory that temporarily stores second image data generated at a high frames per second may be implemented with a small capacity.

Figure 2:
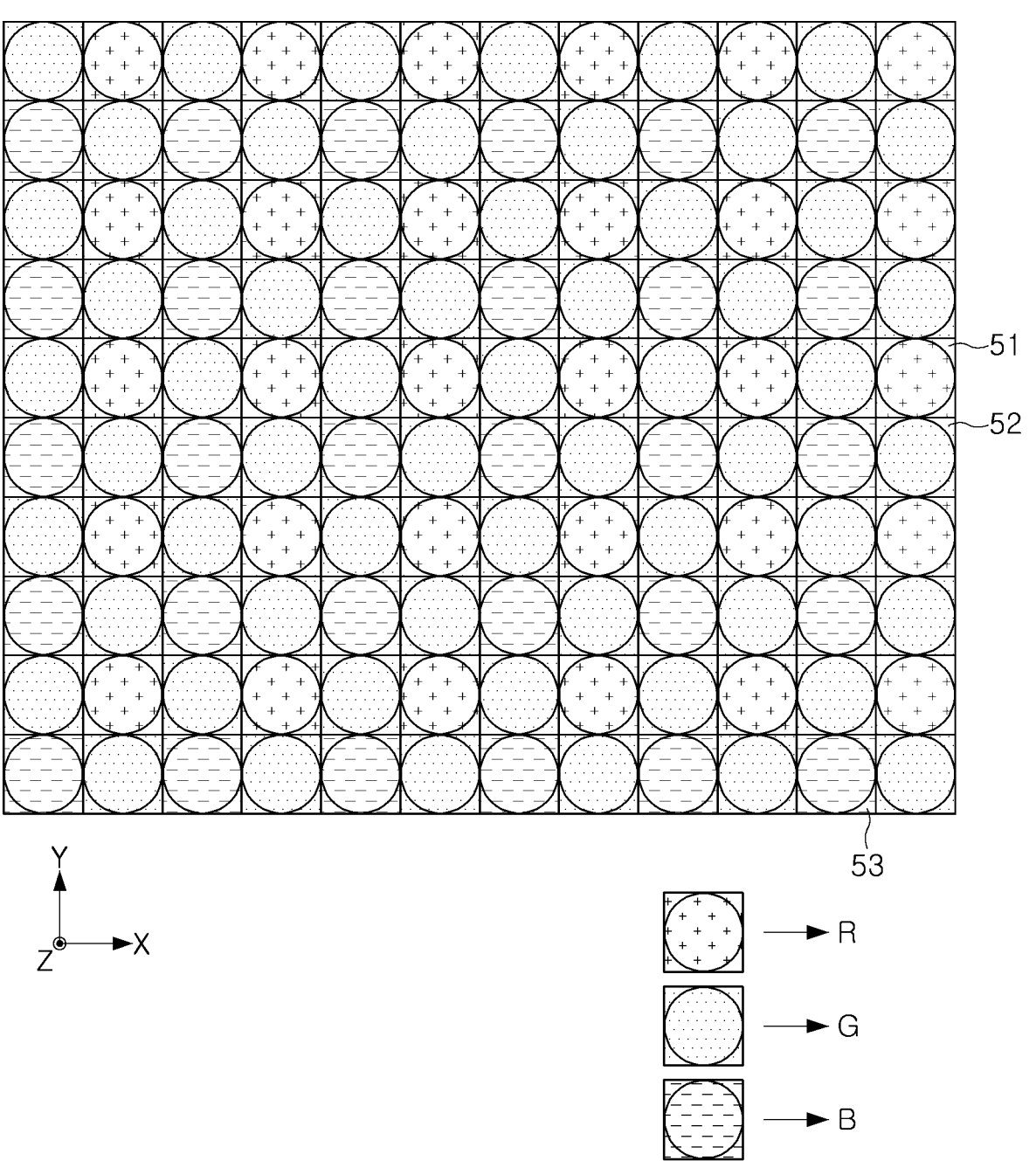
FIG. 2 is a view schematically illustrating a portion of a pixel array included in an image sensor according to one or more example embodiments.

FIG. 2 is a view schematically illustrating a portion of a pixel array included in an image sensor according to one or more example embodiments.

Referring to FIG. 2, a pixel array 50 of an image sensor according to an embodiment may include a plurality of pixels 51 to 53 arranged in a first direction (e.g., X-axis direction) and a second direction (e.g., Y-axis direction). For example, the pixel array 50 may include red pixels 51, green pixels 52, and blue pixels 53. Each of the red pixels 51 may include a red color filter, each of the green pixels 52 may include a green color filter, and each of the blue pixels 53 may include a blue color filter.

Depending on embodiments, the color filters of the pixels 51 to 53 included in the pixel array 50 may be implemented in more diverse manners. For example, at least a portion of the green pixels 52 may include a white color filter that passes white light, instead of the green color filter. Alternatively, at least a portion of the green pixels 52 may include a yellow color filter that passes yellow light, instead of the green color filter.

Figure 3:
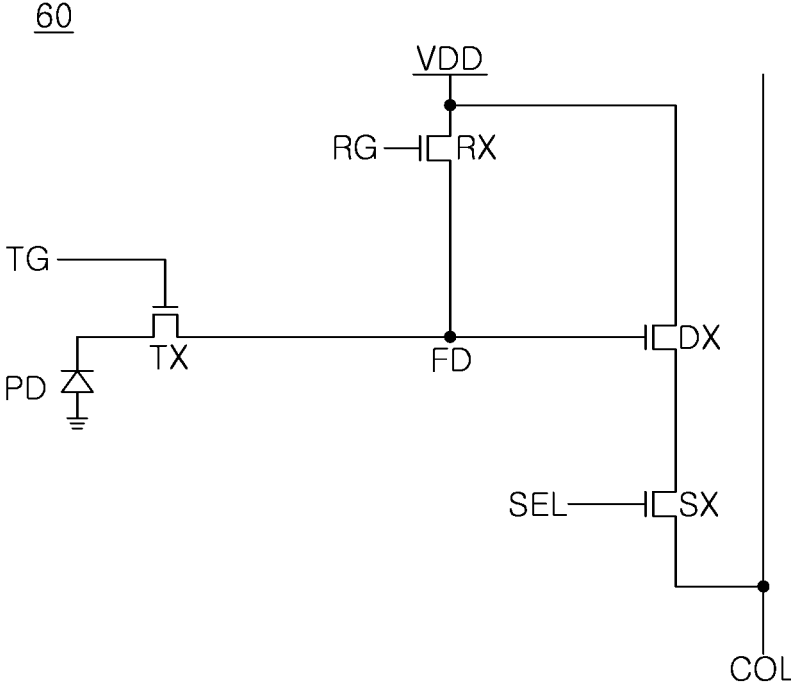
FIG. 3 is a circuit diagram schematically illustrating a pixel disposed in a pixel array of an image sensor according to one or more example embodiments.

FIG. 3 is a circuit diagram schematically illustrating a pixel disposed in a pixel array of an image sensor according to one or more example embodiments.

Referring to FIG. 3, a pixel 60 disposed in a pixel array may include a photodiode PD, a transfer transistor TX, a reset transistor RX, a drive transistor DX, a select transistor SX, and the like. A node to which the transfer transistor TX, the reset transistor RX, and the drive transistor DX are connected to each other may be provided as a floating diffusion FD, and when the transfer transistor TX is turned on, charges generated from the photodiode PD may move to the floating diffusion FD.

A readout operation of acquiring a pixel signal from the pixel 60 and converting the pixel signal into pixel data may start with a reset operation for the pixel 60. For example, when the transfer transistor TX and the reset transistor RX are turned on respectively according to a transmission control signal TG and a reset control signal RG, the floating diffusion FD may be connected to a power supply node supplying a power supply voltage VDD, and may be reset. The drive transistor DX, which operates as a source-follower amplifier, may amplify a voltage of the reset floating diffusion FD, and a reset voltage may be output to a column line COL by turning on the select transistor SX according to a select control signal SEL.

After the floating diffusion FD is reset, the photodiode PD may be exposed to light and may generate charges for a predetermined exposure time. When the exposure time ends, the transfer transistor TX may be turned on and the charge of the photodiode PD may move to the floating diffusion FD. When a main charge carrier of the photodiode PD may be an electron, a voltage of the floating diffusion FD may decrease. The drive transistor DX may amplify the voltage of the floating diffusion FD, and when the select transistor SX is turned on, a pixel voltage may be output to the column line COL. A readout circuit connected to the column line COL may digitally convert a difference between the reset voltage and the pixel voltage, to generate pixel data corresponding to the pixel 60.

Figure 4:
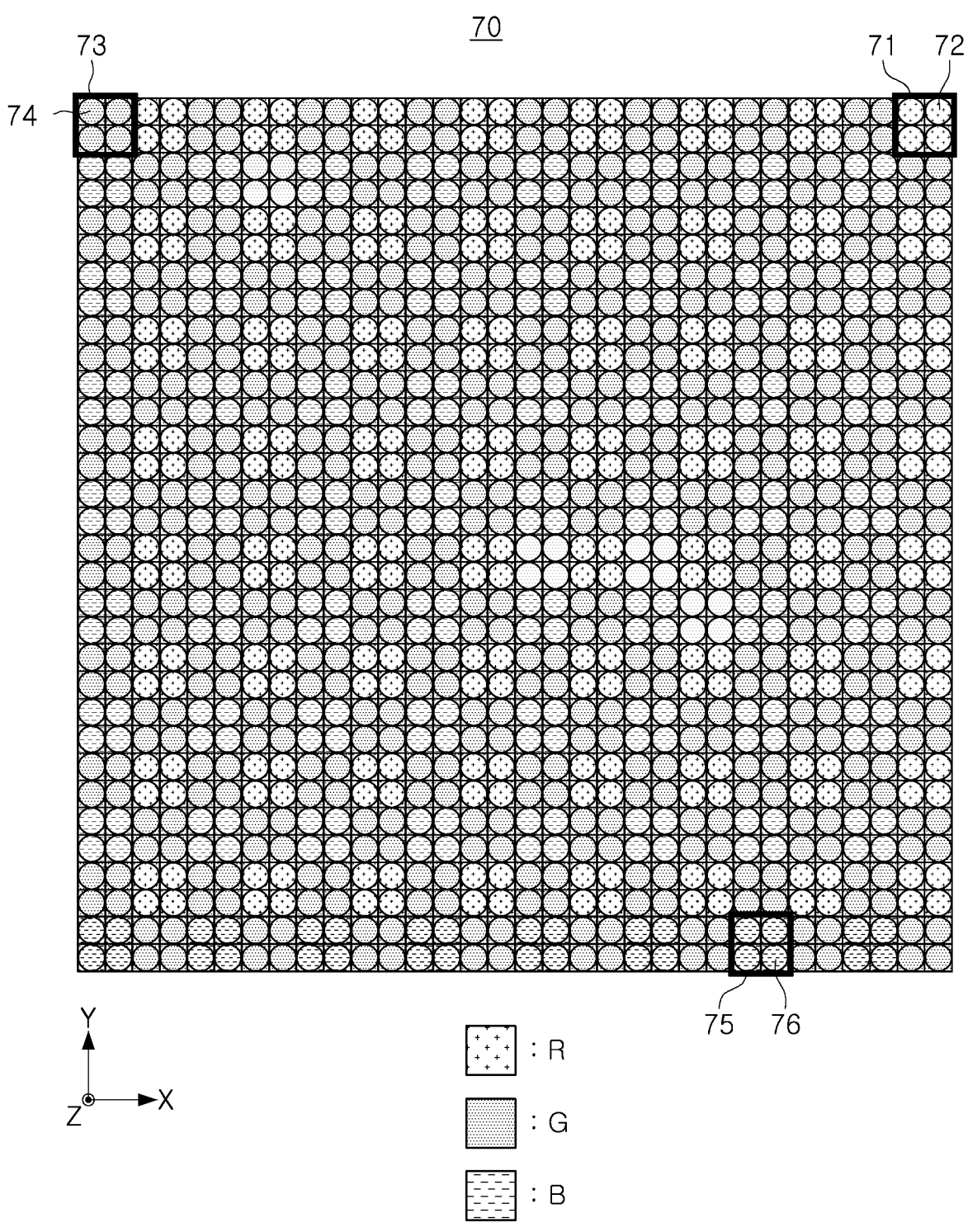
FIG. 4 is a view schematically illustrating a portion of a pixel array included in an image sensor according to one or more example embodiments.

FIG. 4 is a view schematically illustrating a portion of a pixel array included in an image sensor according to one or more example embodiments.

Referring to FIG. 4, a pixel array 70 of an image sensor according to an embodiment may include a plurality of pixel groups 71, 73, and 75 arranged in the first direction (e.g., X-axis direction) and second direction (e.g., Y-axis direction). In an embodiment illustrated in FIG. 4, each of the plurality of pixel groups 71, 73, and 75 may include two or more pixels (e.g., 72, 74, and 76) that may be adjacent to each other in at least one of the first direction or the second direction and share a color filter of the same color.

In each of the plurality of pixel groups 71, 73, and 75, two or more pixels (e.g., 72, 74, and 76) may include a color filter of the same color. For example, first pixel groups 71 may include red pixels 72 having a red color filter, respectively, and second pixel groups 73 may include green pixels 74 having a green color filter, respectively. Third pixel groups 75 may include blue pixels 76 having a blue color filter, respectively. A color of a color filter may be changed depending on an embodiments. For example, each of the second pixel groups 73 arranged alternately with the first pixel groups 71 in the first direction may include the green pixels 74 having a green color filter, while each of the second pixel groups 73 alternately arranged with the third pixel groups 75 in the second direction may include white pixels having a white color filter.

In each of the plurality of pixel groups 71, 73, and 75, two or more pixels (e.g., 72, 74, and 76) may be arranged in a 2×2 form. Each of the pixels (e.g., 72, 74, and 76) may include a photodiode and a transfer transistor. In an embodiment, the pixels (e.g., 72, 74, and 76) included in each of the pixel groups 71, 73, and 75 may share a floating diffusion, a reset transistor, a drive transistor, and a select transistor.

Figure 5:
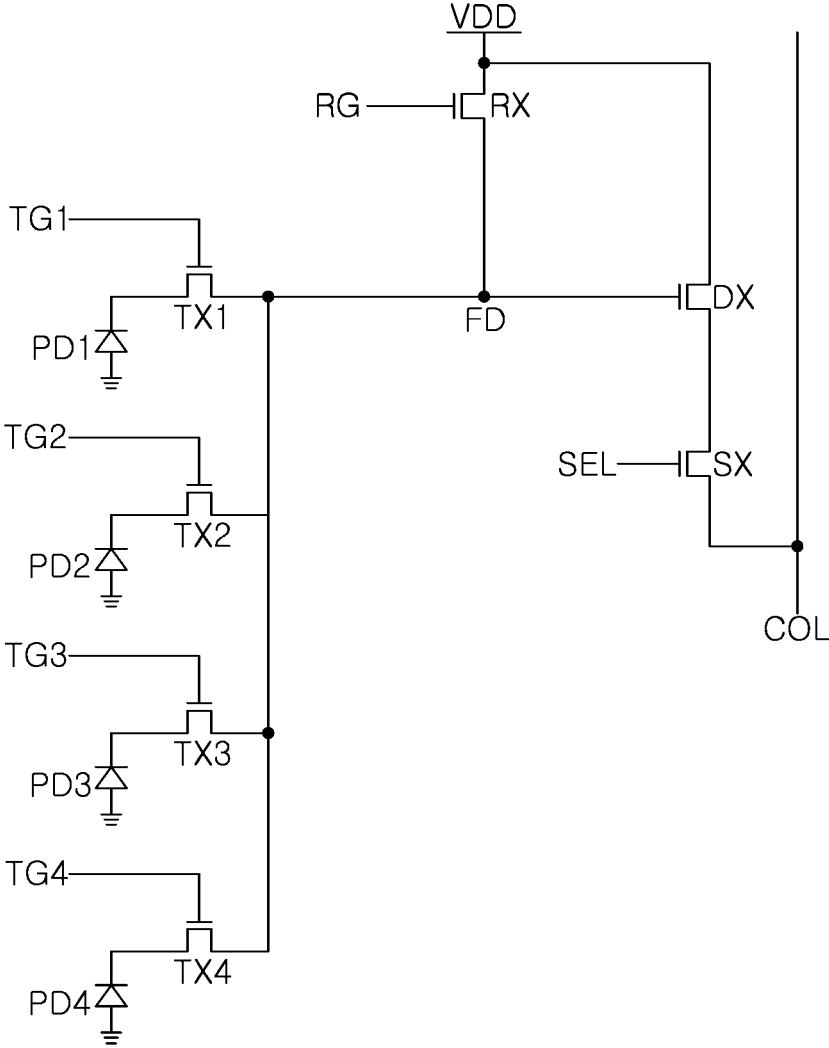
FIG. 5 is a circuit diagram schematically illustrating a pixel disposed in a pixel array of an image sensor according to one or more example embodiments.

FIG. 5 is a circuit diagram schematically illustrating a pixel disposed in a pixel array of an image sensor according to one or more example embodiments.

FIG. 5 may be a circuit diagram schematically illustrating a pixel circuit corresponding to a pixel group 80 included in a pixel array according to an embodiment (e.g., pixel array 70 as illustrated in FIG. 4 above). As previously described with reference to FIG. 4, the pixel group 80 may include first to fourth pixels arranged in a 2×2 form. Referring to FIG. 5, a first pixel may include a first photodiode PD1 and a first transfer transistor TX1, and a second pixel may include a second photodiode PD2 and a second transfer transistor TX2. A third pixel may include a third photodiode PD3 and a third transfer transistor TX3, and a fourth pixel may include a fourth photodiode PD4 and a fourth transfer transistor TX4.

In an embodiment, the first to fourth pixels may share a floating diffusion FD, a reset transistor RX, a drive transistor DX, and a select transistor SX, and may be connected to a column line COL. Therefore, in a readout operation for the pixel group 80, pixel data may be sequentially obtained from each of the first to fourth pixels.

For example, after turning on the first transfer transistor TX1 and the reset transistor RX to reset the floating diffusion FD and the first photodiode PD1, the first photodiode PD1 may be exposed to light for a predetermined exposure time to generate charges. When the exposure time elapses, the first transfer transistor TX1 may be turned on to move the charge of the first photodiode PD1 to the floating diffusion FD, and the select transistor SX may be turned on. A readout circuit of an image sensor may obtain a pixel signal corresponding to a difference between a reset voltage and a pixel voltage through the column line COL, and may convert the pixel signal into pixel data. The above operations may be sequentially performed for the second to fourth photodiodes PD2 to PD4 to perform a readout operation for the pixel group 80.

Figure 6:
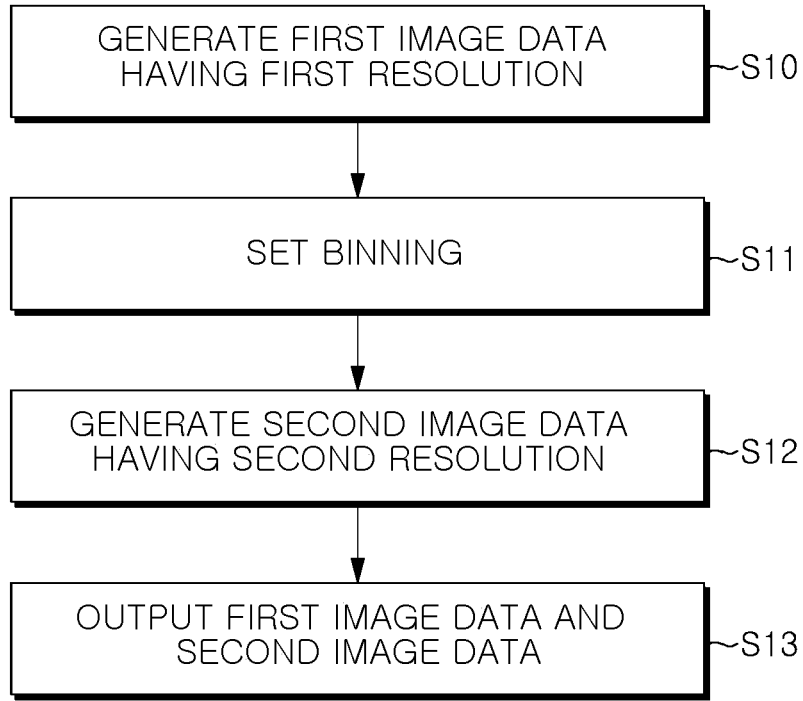
FIG. 6 is a flowchart illustrating an operation of an image sensor according to one or more example embodiments.

FIG. 6 is a flowchart illustrating an operation of an image sensor according to one or more example embodiments.

Referring to FIG. 6, an image sensor according to an embodiment may generate first image data having a first resolution (S10). For example, the first image data may be image data generated from pixel data respectively obtained from a plurality of pixels arranged in a pixel array in the image sensor.

When the first image data is generated, the image sensor may perform binning setting (S11). The binning setting may be performed to generate a piece of binning pixel data based on pixel data obtained from two or more pixels arranged adjacent to each other in the pixel array. As a result, an effect of obtaining pixel data from fewer pixels than all of pixels arranged in the pixel array may be achieved by the binning setting.

The image sensor may generate second image data having a second resolution, after binning is set (S12). A piece of binning pixel data may be generated from pixel data obtained from the two or more pixels by the binning setting, and the binning pixel data may be determined by a pixel value of each of the binning pixels included in the second image data. Therefore, the second resolution may be lower than the first resolution.

The image sensor may output the first image data and the second image data (S13). For example, the first image data may be output before the second image data because the first image data is generated before the second image data. Alternatively, depending on an embodiment, the second image data may be output before the first image data. However, the disclosure is not limited thereto and the first image data and the second image data may be output in a different manner. For example, the first image data and the second image data may be output together.

A processor connected to the image sensor may generate a resultant image using the first image data and the second image data. Depending on an embodiment, various resultant images may be generated from the first image data and the second image data, which will be described later with reference to FIG. 7.

Figure 7:
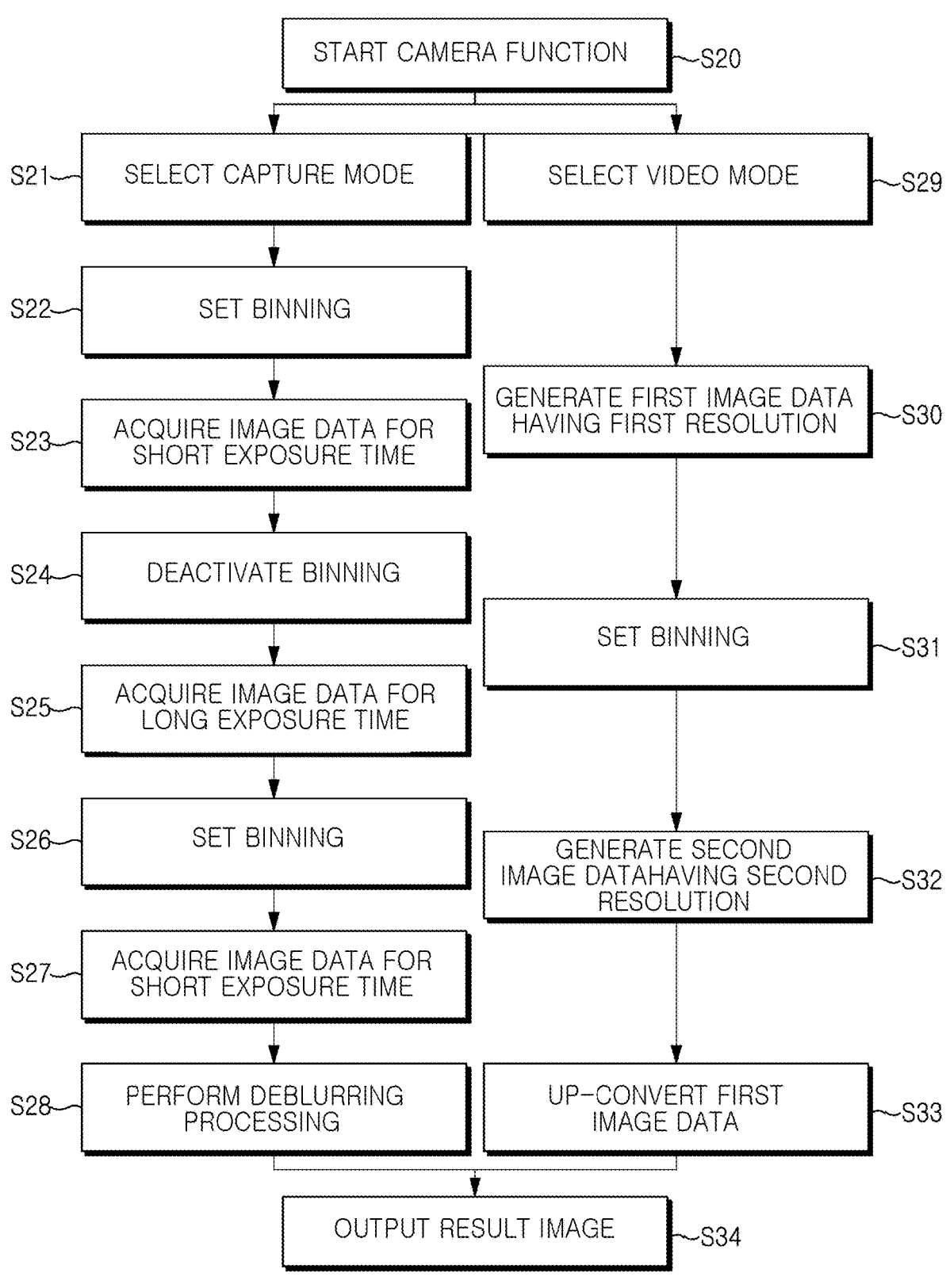
FIG. 7 is a flowchart illustrating an operation of an electronic device according to one or more example embodiments.

FIG. 7 is a flowchart illustrating an operation of an electronic device according to one or more example embodiments.

Referring to FIG. 7, an electronic device according to an embodiment may perform a camera function (S20). When the camera function is activated in the electronic device, an operation mode, for example among a capture mode or a video mode, may be selected as the camera function, and an operation in an image sensor and a processor connected to the image sensor may be performed in accordance with the selected operation mode.

The capture mode may be an operation mode for taking a still image, e.g., a photo. When it is confirmed that the capture mode has been selected as the camera function (S21), the image sensor may perform binning setting (S22). As previously described with reference to FIG. 6, when binning is set, the image sensor may generate binning pixel data using pixel data acquired from two or more pixels adjacent to each other. The binning pixel data may be data corresponding to a binning pixel defined by the two or more pixels adjacent to each other.

For example, the binning pixel may be defined as pixels adjacent to each other and arranged in an M×M form. Depending on an embodiment, the binning pixel data may be generated using pixel data obtained from four pixels adjacent to each other and arranged in a 2×2 form, or the binning pixel data may be generated using pixel data obtained from 16 pixels adjacent to each other and arranged in a 4×4 form. In an embodiment, the binning pixel may be generated using pixel data obtained from a plurality of N×N arranged pixels, and the each of N×N arranged pixels may be spaced apart from each other.

After the binning setting, the image sensor may acquire image data for a relatively short exposure time (S23). For example, the image sensor may set an exposure time of the binning pixel as a second exposure time, which is a relatively short time, compared to a first exposure time that will be described below, and may acquire the binning pixel data from binning pixels, to generate image data. When image data corresponding to a short exposure time is acquired, the binning setting may be deactivated in the image sensor (S24).

When the binning setting is deactivated, the image sensor may acquire image data for a long exposure time (S25). For example, the image sensor may set an exposure time of each of a plurality of pixels arranged in a pixel array as the first exposure time, longer than the second exposure time, and may acquire pixel data from each of the plurality of pixels, to generate image data. When image data is generated based on pixel data obtained from each of the plurality of pixels, the image sensor may perform binning setting again (S26).

When the binning setting is completed, the image sensor may expose the binning pixels to light for the second exposure time, and may acquire image data (S27). Image data generated by the image sensor when the binning setting is deactivated may have a relatively higher resolution than image data generated by the image sensor when the binning setting is activated. Hereinafter, for convenience of explanation, high-resolution image data generated in S25 may be referred to as first image data, low-resolution image data generated in S27 may be referred to as second image data, and low-resolution image data generated in S23 may be referred to as third image data.

The image sensor may transmit the first to third image data generated in S22 to S27 to the processor, and each of the first to third image data transmitted to the processor may be a single frame. The processor may perform a deblurring processing using the first to third image data received from the image sensor (S28). In the deblurring processing, the processor may remove a blur existing in the high-resolution first image data with reference to the second image data and the third image data.

For example, the processor may calculate a motion vector representing movement of a subject between a point in time of capturing the subject for generating the second image data and a point in time of capturing the subject for generating the third image data, with reference to the second image data and the third image data. Based on the calculated motion vector, the processor may perform the deblurring processing for removing a blur phenomenon appearing on the subject in the first image data.

The second image data and the third image data may be used to determine the movement of the subject, and may thus be generated as black-and-white image data, unlike the first image data, which is RGB image data. Also, depending on an embodiment, the second image data and the third image data may be generated before the first image data. The processor may determine the movement of the subject from image data generated prior to the first image data and/or from image data generated after the first image data, and may perform the deblurring processing for correcting shaking of the subject from the first image data with reference to the image data generated prior to and/or after the first image data.

When the video mode is selected as the camera function, the image sensor may output image data having a predetermined frames per second (FPS). For example, the image data output by the image sensor in video mode may include dozens or more frames per second.

When it is confirmed that the video mode has been selected (S29), the image sensor may generate the first image data having the first resolution without binning setting (S30). The first image data generated in S30 may include a plurality of frames, and a resolution of each of the plurality of frames may be the first resolution. When first image data is generated, the binning setting may be activated in the image sensor (S31).

When binning is set, the image sensor may generate binning pixel data using pixel data obtained from two or more pixels adjacent to each other. As described above, the binning pixel data may be data corresponding to a binning pixel defined by two or more pixels adjacent to each other. The image sensor may generate second image data having a second resolution, lower than the first resolution, using the binning pixel data (S32).

The second image data may be image data generated by the image sensor in a state in which binning is set. Therefore, the second image data having a relatively low resolution may be generated at a faster frames per second than the first image data having a high resolution. In an embodiment, the second image data comprises more than 10 second image data frames.

The processor may receive the first image data and the second image data from the image sensor, and may up-convert the first image data using the second image data (S33). By the up-conversion operation in S33, the frames per second of the first image data may increase. Therefore, in a video mode, the processor may produce a resultant image having a high resolution and a high frames per second.

When the deblurring is completed in the capture mode or the up-conversion may be completed in the video mode, the processor may output the resultant image (S34). In an electronic device according to an embodiment, a processor may use image data generated by an image sensor at different resolutions using one pixel array to correct a blur of a subject appearing in a still image or to increase the frames per second. Therefore, in an image sensor including one pixel array, a high-quality resultant image may be provided to a user.

Figure 8:
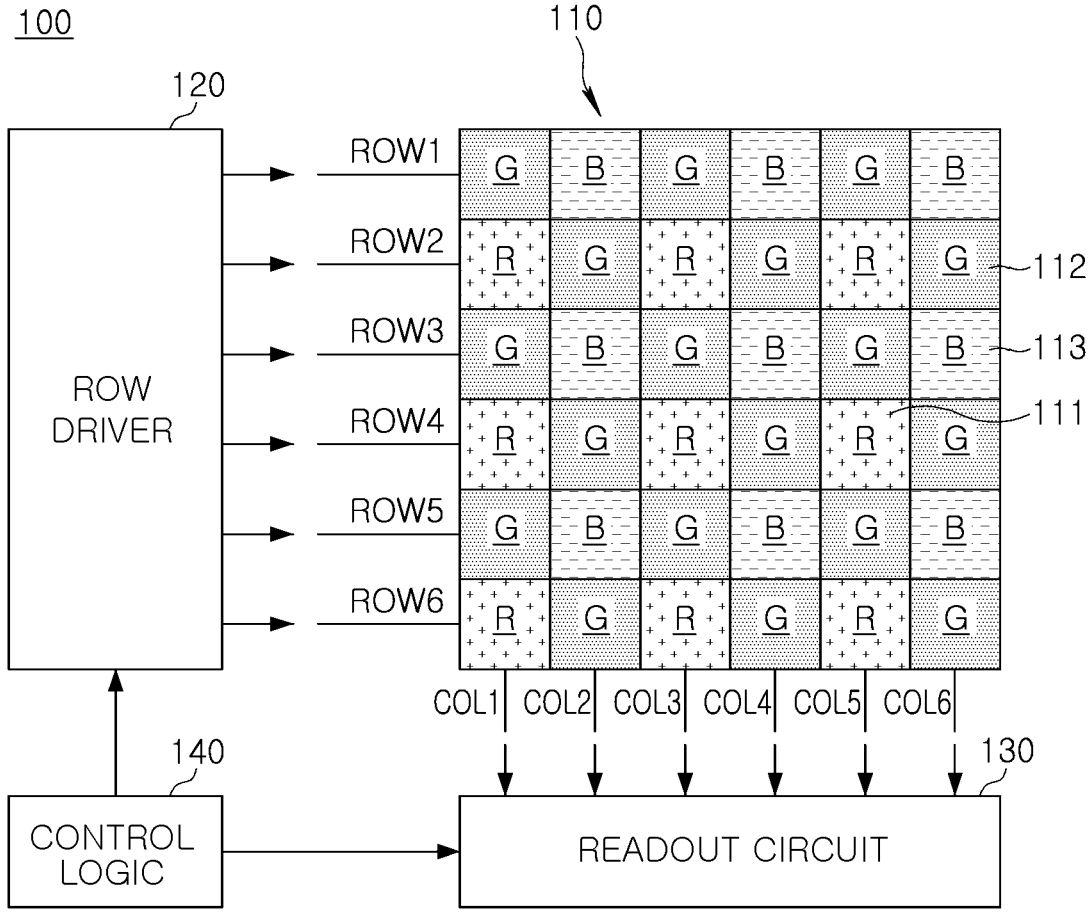
FIGS. 8 and 9 are views illustrating an operation of an image sensor according to one or more example embodiments.
Figure 9:
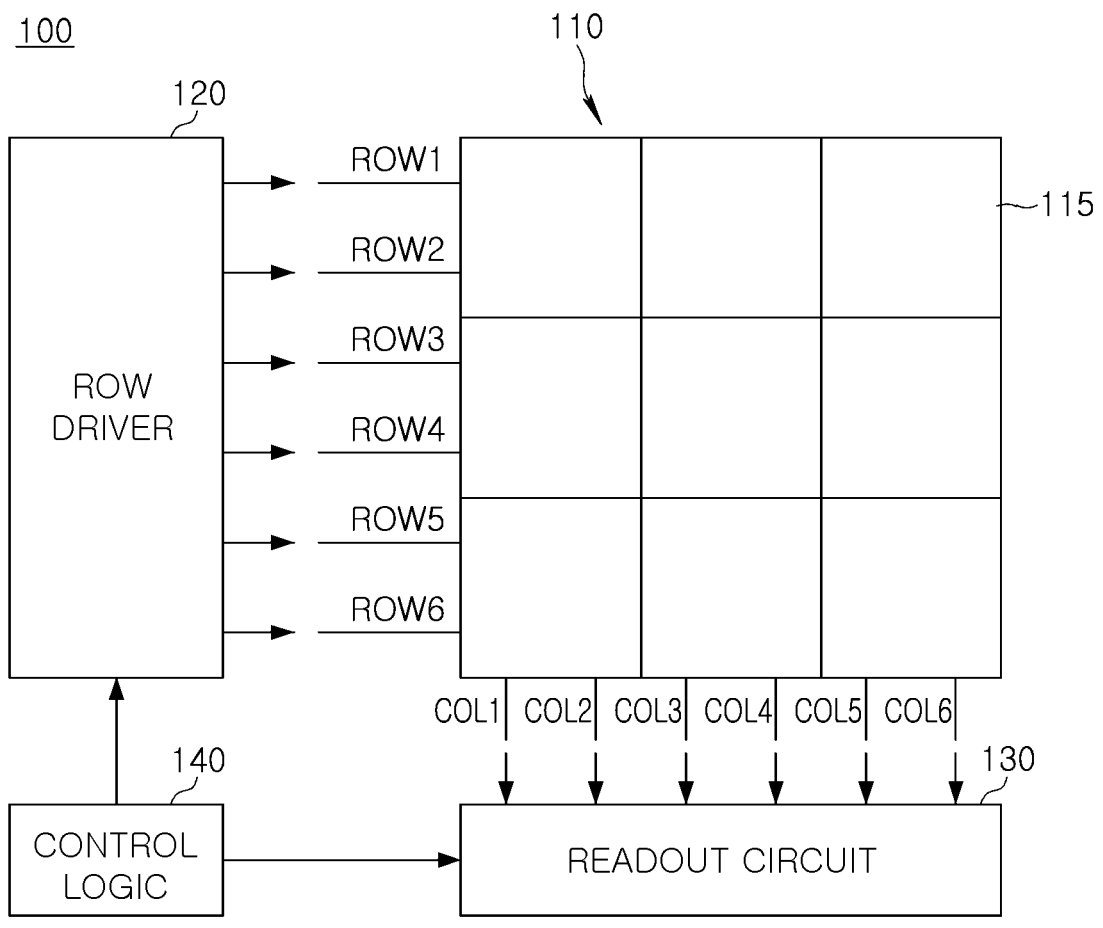

FIGS. 8 and 9 are views illustrating an operation of an image sensor according to one or more example embodiments.

Referring to FIGS. 8 and 9, an image sensor 100 according to an embodiment may include a pixel array 110, a row driver 120, a readout circuit 130, and a control logic 140. FIG. 8 is a view illustrating an operation of an image sensor 100 when binning setting is deactivated. FIG. 9 is a view illustrating an operation of an image sensor 100 when binning setting is activated.

First, referring to FIG. 8, a plurality of red pixels 111, a plurality of green pixels 112, and a plurality of blue pixels 113 may be disposed in a pixel array 110. Arrangement of the pixels (e.g., 111 to 113) is not limited to that illustrated in FIG. 8, and may be modified in various manners, depending on an embodiment. The row driver 120 may be connected to the plurality of pixels (111 to 113) through a plurality of row lines ROW1 to ROW6, and the readout circuit 130 may be connected to the plurality of pixels (111 to 113) through a plurality of column lines COL1 to COL6.

Each of the plurality of pixels (111 to 113) may include a photodiode and a pixel circuit, and the pixel circuit may include at least one transistor. Depending on an embodiment, each of the row lines ROW1 to ROW6 may include a plurality of control signal lines for transmitting a signal that controls a transistor included in the pixel circuit.

When binning setting is not activated, the row driver 120 may sequentially drive the plurality of row lines ROW1 to ROW6, and the readout circuit 130 may acquire a pixel signal corresponding to a difference between a reset voltage and a pixel voltage from the plurality of pixels (111 to 113). The readout circuit 130 may convert the pixel signal into pixel data, which may be digital data, and may output the same. Therefore, in the embodiment of FIG. 8 in which the binning setting is not activated, first image data output by an image sensor 100 may have a first resolution corresponding to the number of pixels (111 to 113) arranged in the pixel array 110.

When binning setting is activated, as illustrated in FIG. 9, two or more pixels (111 to 113) adjacent to each other in a pixel array 110 may be defined as a binning pixel 115. For example, the binning pixel 115 may be defined by a plurality of pixels arranged in an M×M form, and, as an embodiment illustrated in FIG. 9, may be defined by four pixels (111 to 113) adjacent to each other in a 2×2 form. The number and arrangement of pixels included in the binning pixel 115 may be changed depending on an embodiment. For example, the binning pixel 115 may be defined to include more than 8 pixels. For example, the binning pixel 115 may be defined to include 16 pixels arranged in a 4×4 form.

In a state in which the binning setting is activated, the row driver 120 may drive the pixel array 110 in units of binning pixels 115. In an embodiment illustrated in FIG. 9, the row driver 120 may select and drive the binning pixels 115 arranged along a first row using a first row line ROW1 and a second row line ROW2.

The readout circuit 130 may obtain binning pixel data from the selected binning pixels 115. For example, the row driver 120 may use control signals respectively input to the first row line ROW1 and the second row line ROW2, to drive the binning pixels 115 in a charge binning method in which charges generated in four pixels (111 to 113) included in each of the binning pixels 115 arranged in the first row are simultaneously accumulated in a floating diffusion. The readout circuit 130 may generate binning pixel data determined by the charges generated in the four pixels (111 to 113) included in each of the binning pixels 115.

Since one binning pixel 115 may be defined by four pixels (111 to 113) adjacent to each other, second image data output by an image sensor 100 when the binning setting is activated has a second resolution that may be lower than the first resolution of the first image data corresponding to the number of pixels (111 to 113) arranged in the pixel array 110. Since each of the binning pixels 115 has a relatively large area, as compared to each of the pixels (111 to 113), an exposure time of each of the binning pixels 115 may be set to be shorter than an exposure time of each of the pixels (111 to 113). Therefore, the second image data output by the image sensor 100 with the binning setting activated may have a faster frames per second than the first image data output by the image sensor 100 with the binning setting deactivated.

A processor connected to the image sensor 100 may receive the first image data and the second image data from the image sensor 100. The processor may include a neural engine, an image signal processor, and the like for image processing, and may perform a post-processing work to increase the frames per second of first image data by using second image data having a faster frames per second than the first image data, correct shaking of a subject appearing in the first image data, and/or the like. Therefore, by using only the image sensor 100 including one pixel array 110 in which pixels (111 to 113) of the same type are arranged, a high-quality resultant image to a user may be provided.

Figure 10:
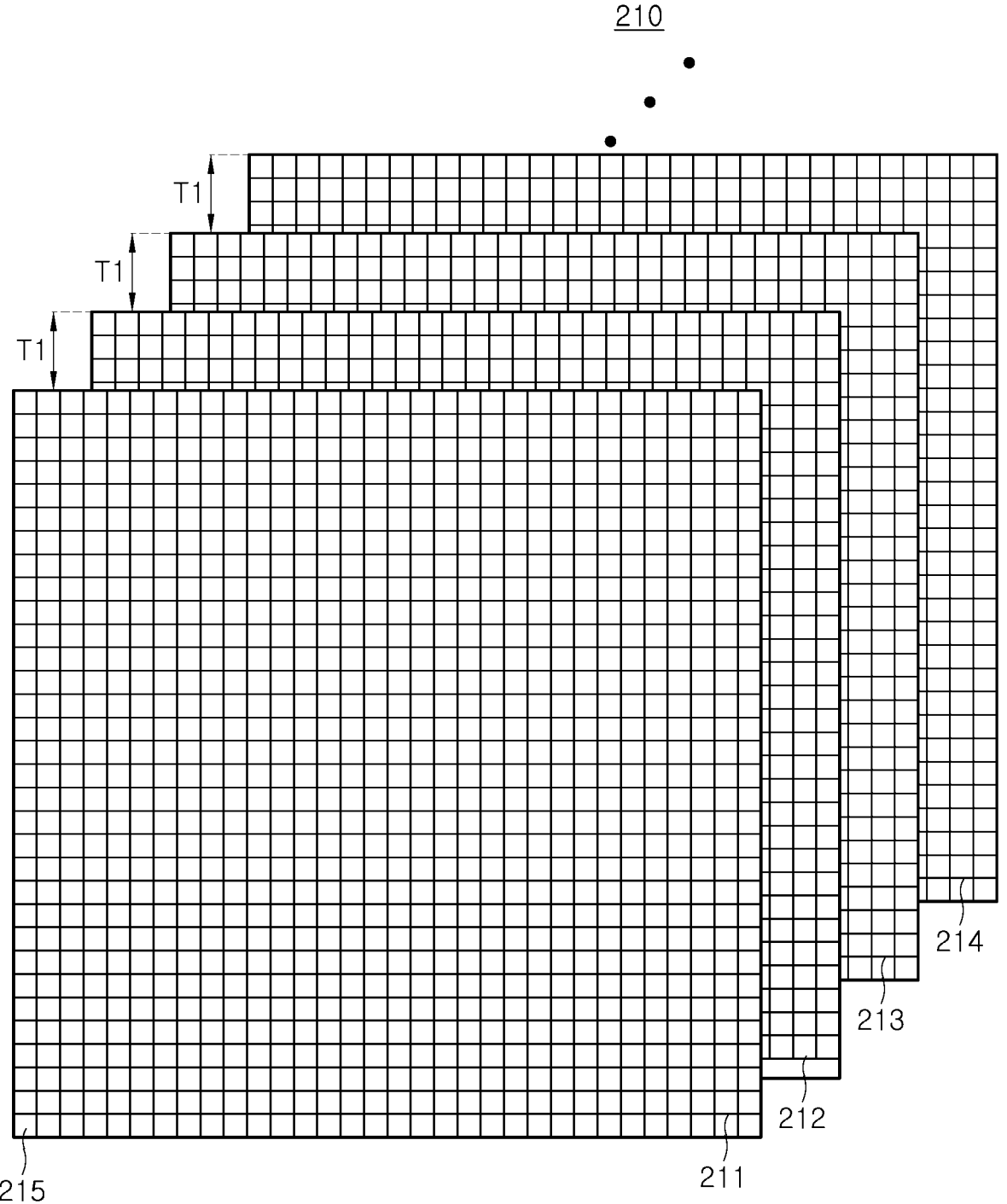
FIGS. 10 to 12 are views illustrating an operation of an electronic device according to one or more example embodiments.
Figure 11:
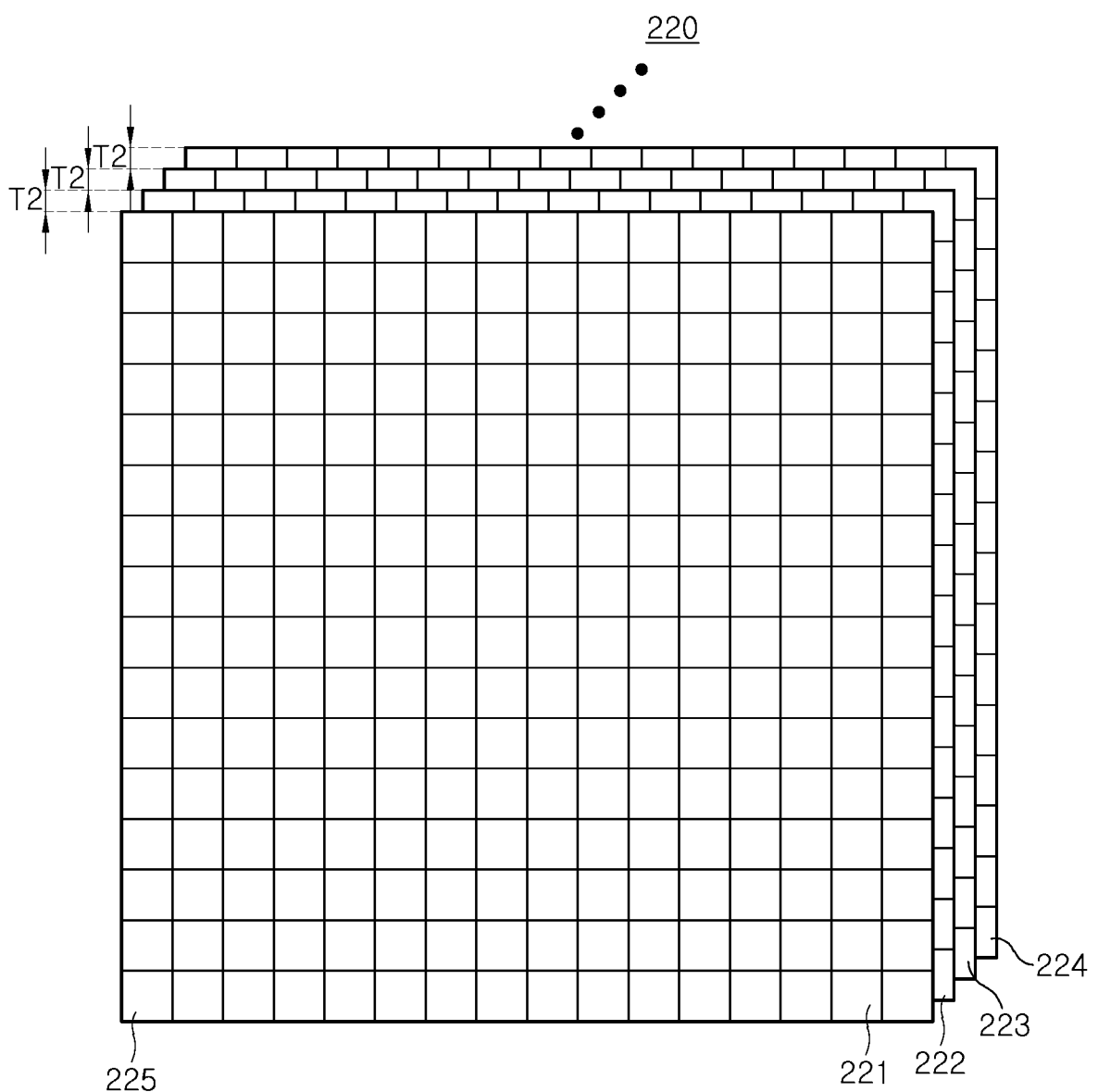
Figure 12:
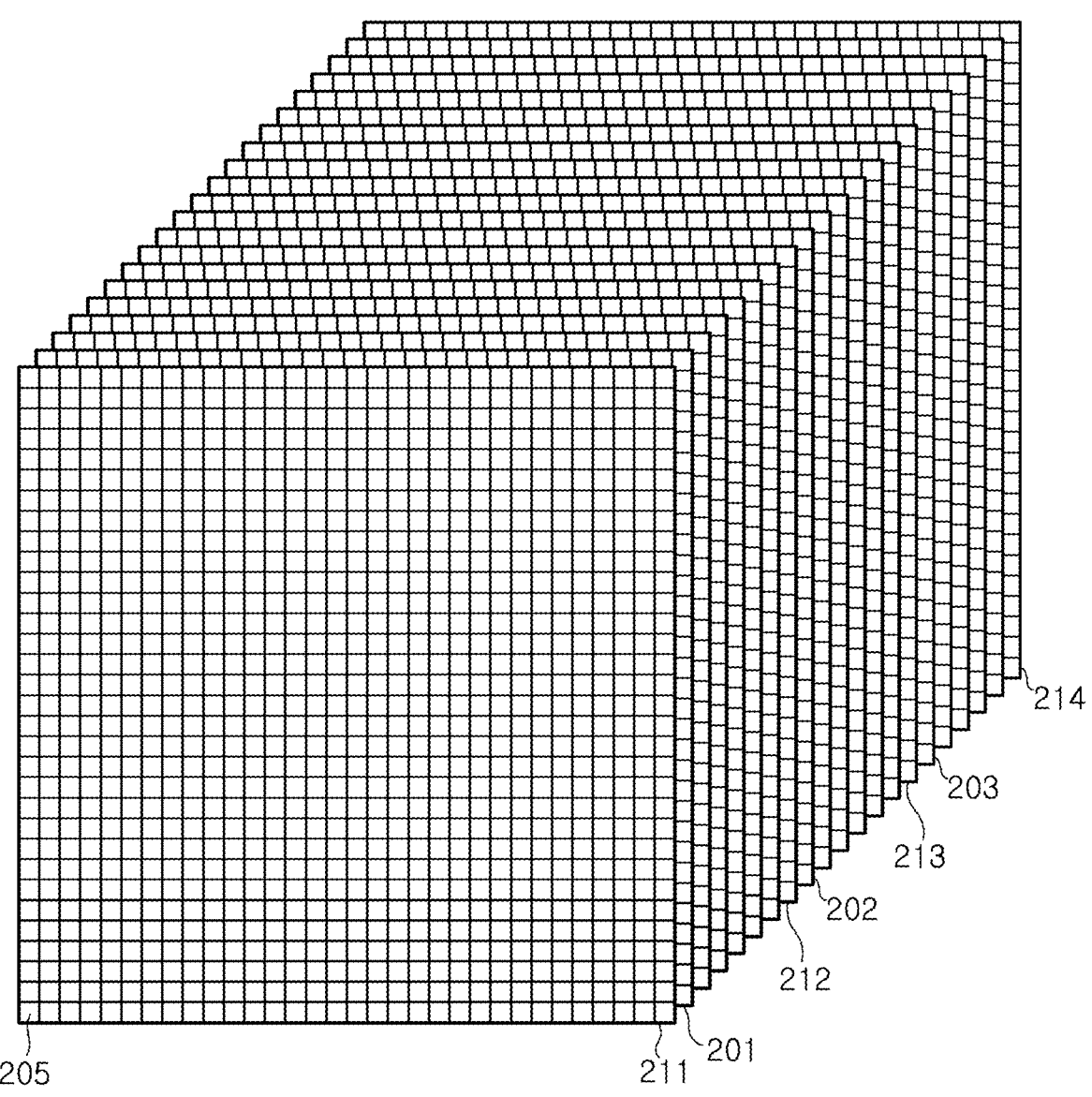

FIGS. 10 to 12 are views illustrating an operation of an electronic device according to one or more example embodiments.

FIG. 10 is a view schematically illustrating first image data 210 output from an image sensor and received by a processor, and FIG. 11 is a view schematically illustrating second image data 220 output from an image sensor and received by a processor. The first image data 210 and the second image data 220 may be data output from the image sensor operating in a video mode. The first image data 210 and the second image data 220 may be data generated by an image sensor, and the image sensor may include only one pixel array.

First, referring to FIG. 10, first image data 210 may include a plurality of first image frames 211 to 214. One frame of the plurality of first image frames 211 to 214 may be output at every first time period T1, and a first frames per second, which may be a frames per second of the first image data 210, may be determined by the first time period T1. Each of the plurality of first image frames 211 to 214 may include first pixels 215, and a first resolution, which may be a resolution of the first image data 210, may be determined by a number of a plurality of first pixels 215.

Next, referring to FIG. 11, second image data 220 may include a plurality of second image frames 221 to 224, and one frame of the plurality of second image frames 221 to 224 may be output at every second time period T2. The second time period T2 may be shorter than the first time period T1, and therefore, a second frames per second of the second image data 220 may be higher than the first frames per second of the first image data 210. Since the second image data 220 may be image data generated in a state in which binning setting is activated, a size of respective second pixels 225 included in the second image data 220 may be larger than a size of respective first pixels 215. Therefore, a second resolution, which may be a resolution of the second image data 220, may be lower than the first resolution of the first image data 210.

A processor connected to an image sensor may receive the first image data 210 and the second image data 220, and may increase the frames per second of the first image data 210, based on the second image data 220, to generate a resultant image 200. FIG. 12 is a view schematically illustrating a resultant image 200 generated by a processor. Referring to FIG. 12, the resultant image 200 may include a plurality of frames 201 to 203 and 211 to 214, and an interval in time between the plurality of frames 201 to 203 and 211 to 214 may be shorter than first time period T1.

In addition to the plurality of first frames 211 to 214 included in first image data 210, the resultant image 200 may further include additional frames 201 to 203 inserted by a processor. For example, one or two or more of the additional frames 201 to 203 may be inserted between a pair of the plurality of first frames 211 to 214 sequentially output at an interval of the first time period T1. Therefore, the resultant image 200 may have a higher frames per second than that of the first image data 210.

In an embodiment, the resultant image 200 may have a resolution, equal to the first resolution of the first image data 210. Referring to FIG. 12, each of the plurality of frames 201 to 203 and 211 to 214 included in the resultant image 200 may include a plurality of pixels 205, and a size of each of the plurality of pixels 205 may be may be equal to a size of each of the plurality of first pixels 215 included in the first image data 210. Therefore, a high-quality resultant image having a high resolution and a high frames per second may be obtained by using an electronic device.

Depending on an embodiment, the second pixels 225 included in the second image data 220 may include event information according to movement of a subject or the like. For example, the event information may include whether an event has occurred, and in an embodiment, binning pixel data obtained from each of binning pixels may be converted to generate second pixel data corresponding to each of the second pixels 225.

For example, first pixel data corresponding to each of the first pixels 215 may be RGB data, and second pixel data corresponding to each of the second pixels 225 may be event data. Therefore, the number of bits of the first pixel data may be greater than the number of bits of the second pixel data. In an embodiment, the image sensor may calculate a difference between a pair of binning pixel data corresponding to each of the binning pixels in a pair of consecutive second image frames 211 to 214, among the plurality of second image frames 211 to 214, to obtain second pixel data for each of the second pixels 225.

To calculate the difference between the pair of binning pixel data corresponding to each of the binning pixels in the pair of second image frames 211 to 214, the image sensor may include a memory that stores the binning pixel data generated for each of the binning pixels. The memory may be implemented with a DRAM, an SRAM, or the like, may be formed on a separate wafer from the image sensor, and may be then bonded with the image sensor.

In an embodiment, the binning pixel data obtained from each of the binning pixels may be converted into a log scale value, and a difference of log scale value between a pair of consecutive second image frames 211 to 214 among the plurality of second image frames 211 to 214 may be calculated. The image sensor may compare the calculated difference with a predetermined threshold value to determine second pixel data for each of the second pixels 225, and may generate second image data 210 based on a result of comparison.

For example, the image sensor may determine the second pixel data as 0 for the second pixel 225 of which difference is smaller than a threshold value, and may determine the second pixel data as 1 for the second pixel 225 of which difference is larger than the threshold value. Therefore, the number of bits of the second pixel data corresponding to each of the second pixels 225 may be smaller than the number of bits of the first pixel data corresponding to each of the first pixels 215. An example of a method of generating the second image data 220 will be described later with reference to FIG. 16.

Figure 13:
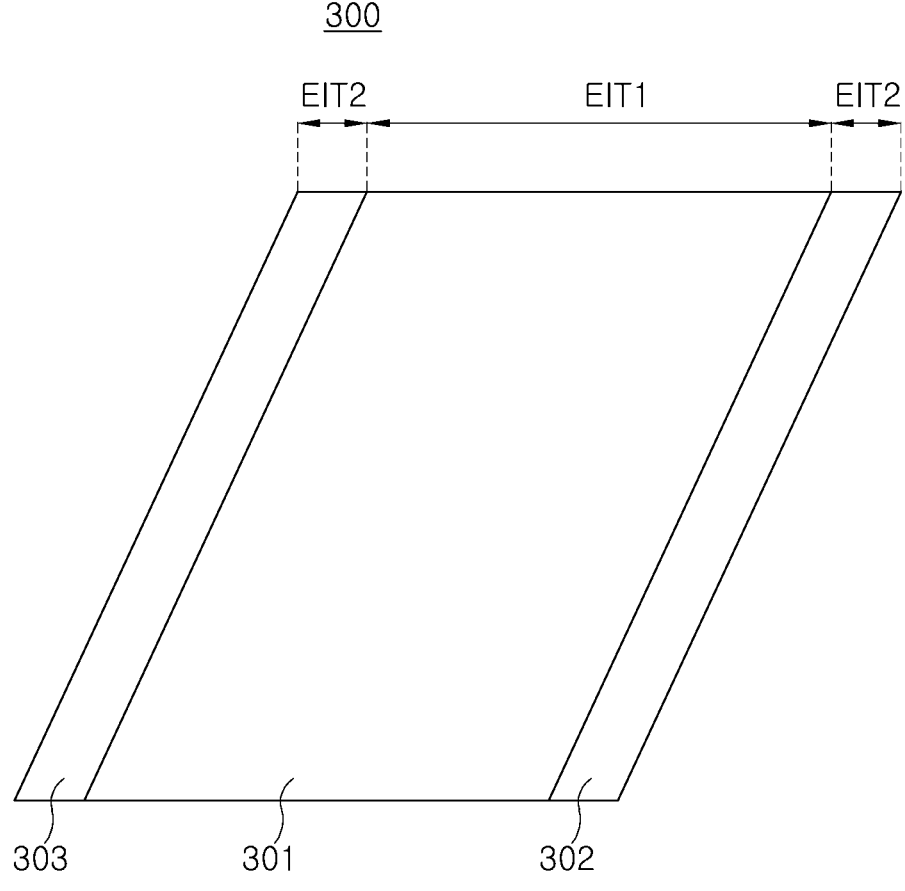
FIGS. 13 to 15 are views illustrating an operation of an electronic device according to one or more example embodiments.
Figure 14:
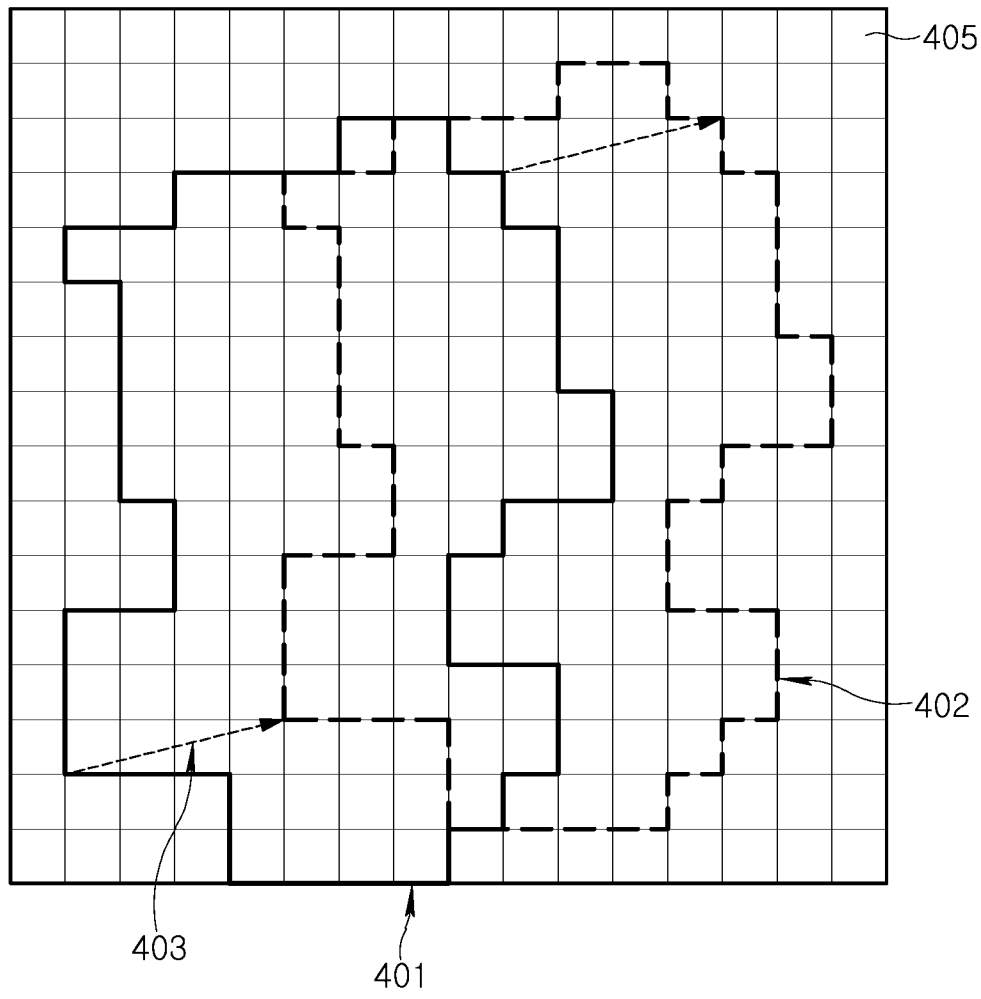
Figure 15:
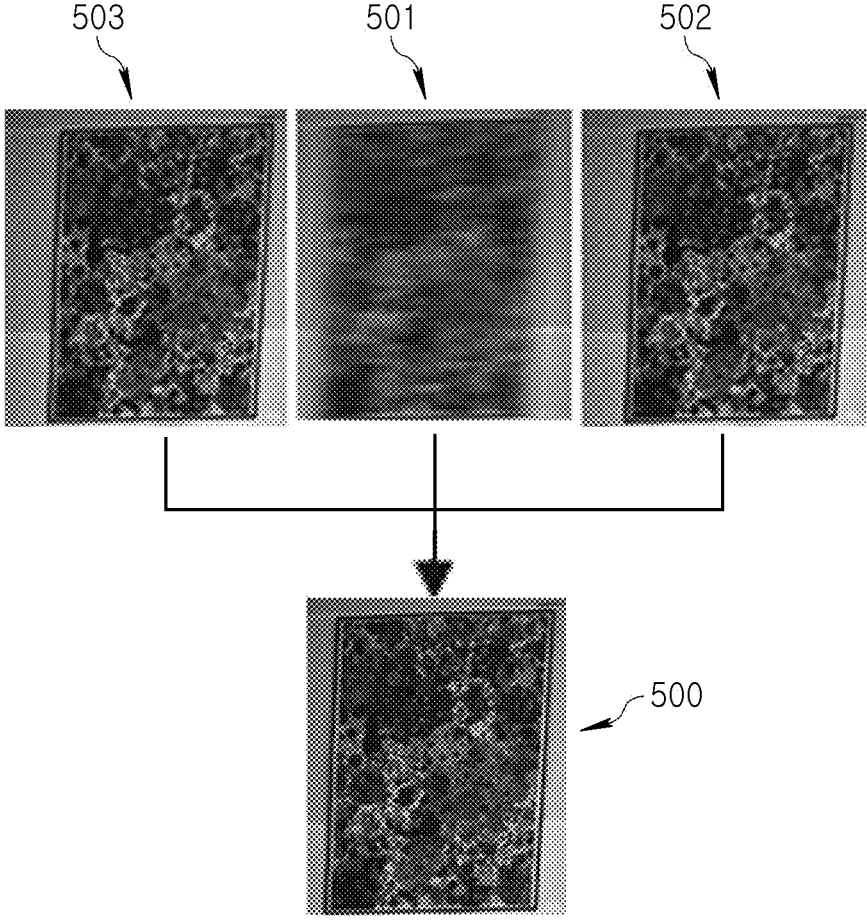

FIGS. 13 to 15 are views illustrating an operation of an electronic device according to one or more example embodiments.

FIGS. 13 to 15 may be views illustrating an operation of an electronic device in a capture mode for shooting a still image. First, referring to FIG. 13, as a shooting function is selected in a capture mode, an image sensor may generate output data 300 including a plurality of image data 301 to 303. In an embodiment, each of the plurality of image data 301 to 303 may include one frame.

First image data 301 may be image data obtained by imaging a subject in a high resolution. The first image data 301 may be generated using pixel data obtained by the image sensor from each of a plurality of pixels without binning setting. In an operation of generating the first image data 301, each of the plurality of pixels may receive light, and may generate charges during a first exposure time EIT1.

Second image data 302 and third image data 303 may be data generated by the image sensor in a state in which binning setting is activated. For example, the image sensor may define binning pixels by binning two or more pixels arranged adjacent to each other in a pixel array, and may use binning pixel data obtained from each of the binning pixels to generate the second image data 302 and the third image data 303. Therefore, a resolution of the second image data 302 and a resolution of the third image data 303 may be lower than a resolution of the first image data 301.

In an operation of generating the second image data 302 and an operation of generating the third image data 303, each of the plurality of binning pixels may receive light for a second exposure time EIT2, shorter than the first exposure time EIT1, to generate charges. The third image data 303 may be generated earlier than the first image data 301, and the second image data 302 may be generated later than the first image data 301. However, this is only an example and the disclosure is not limited thereto.

The image sensor may output the first to third image data 301 to 303 to a processor. The processor may identify the subject in each of the second image data 302 and the third image data 303, and may generate a motion vector based on movement of the subject. Depending on a size of the motion vector representing the movement of the subject between the second image data 302 and the third image data 303, a blur phenomenon in which the subject is not accurately expressed may appear in the first image data 301. The processor may perform deblurring processing to compensate for shaking of the subject, based on the motion vector, and thus may provide a high-quality resultant image to a user.

FIG. 14 may be a view illustrating a method by which a processor generates a motion vector from image data generated earlier and later than first image data. Referring to FIG. 14, in image data captured earlier than first image data, a subject may be identified such as a first edge 401 (represented with a solid line). In image data captured later than the first image data, the subject may be identified such as a second edge 402 (represented with a dotted line). Each of the image data captured earlier and later than the first image data may be one frame, and may be generated by an image sensor in which binning setting is activated. Therefore, a pixel 405 may correspond to a binning pixel in which binning setting is activated.

A processor may calculate a motion vector 403 indicating movement from the first edge 401 to the second edge 402, and may perform a deblurring operation, based thereon, to remove shaking of the subject included in the first image data. The deblurring operation may be performed in a variety of manners, and for example, may compensate for the shaking of the subject in the first image data by performing a deconvolution operation with a motion vector and a region identified as indicating the subject in the first image data.

FIG. 15 may be a view illustrating an example in which shaking of a subject appearing in first image data 501 is compensated for using image data 503, 502 captured earlier and later than the first image data 501. Unlike the first image data 501 captured for a relatively long exposure time, little shaking of the subject may appear in second image data 502 and third image data 503 that are captured for a short exposure time.

A processor may identify the subject in each of the second image data 502 and the third image data 503, and may generate a motion vector indicating movement therebetween. The motion vector may be used to compensate for the shaking in the subject of the first image data 501, and thus a resultant image 500 after the deblurring process has been completed may be generated as illustrated in FIG. 15. A resolution of the resultant image 500 may be equal to a resolution of the first image data 501.

Figure 16:
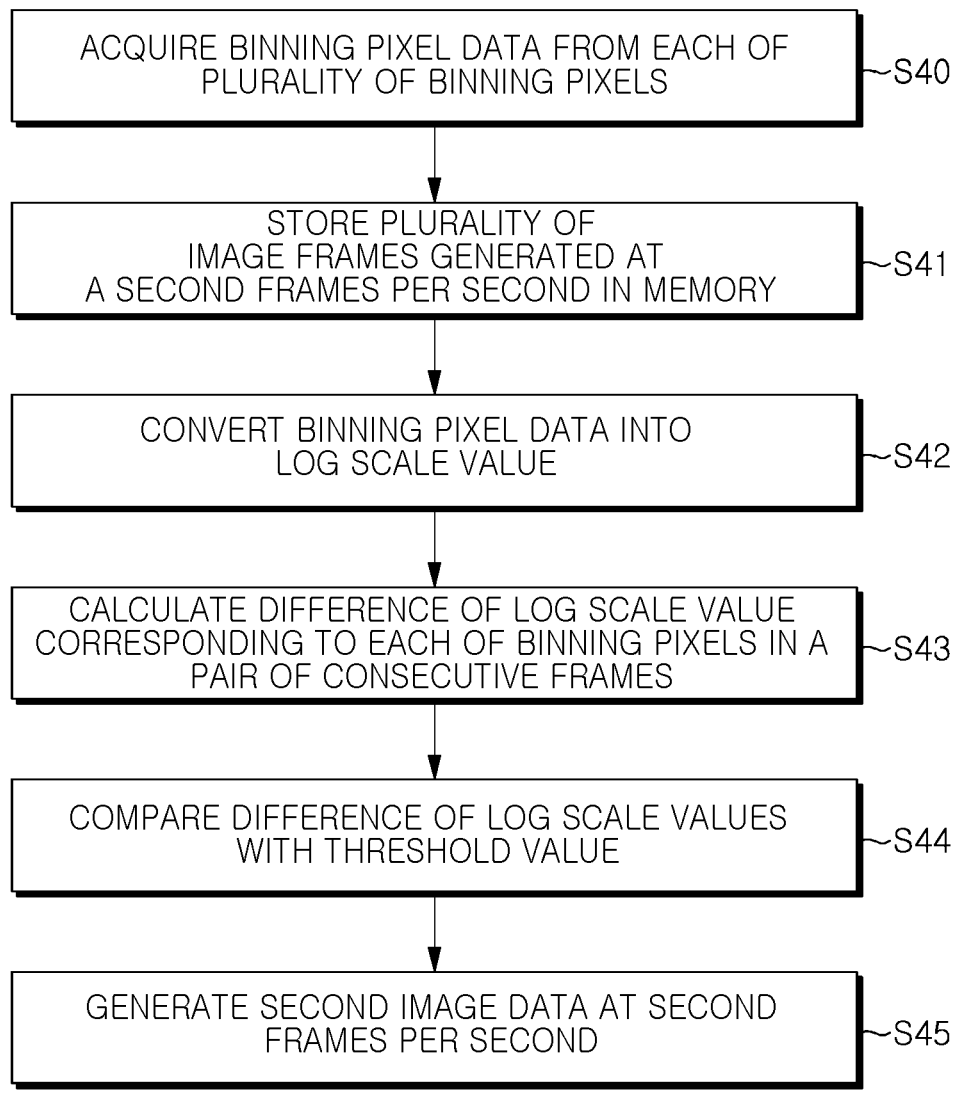
FIG. 16 is a flowchart illustrating an operation of an electronic device according to one or more example embodiments.

FIG. 16 is a flowchart illustrating an operation of an electronic device according to one or more example embodiments.

An electronic device according to an embodiment may include an image sensor and a processor. When a video mode is selected in a camera function of the electronic device, the image sensor may generate first image data having a first resolution and a first frames per second, generate second image data having a second resolution and a second frames per second, and transmit the first image data and the second image data to the processor. For example, the image sensor may transmit the first image data and the second image data to the processor sequentially. The first resolution may be higher than the second resolution, and the first frames per second may be lower than the second frames per second.

The processor may perform an up-conversion operation to increase the frames per second of the first image data, thereby generating a high-quality resultant image having a high resolution and a high frames per second. The processor may increase the frames per second of the first image data with reference to the second image data, and a method of generating the second image data will be described in more detail with reference to FIG. 16.

Referring to FIG. 16, an image sensor of an electronic device according to an embodiment may acquire binning pixel data from each of a plurality of binning pixels (S40). Each of the plurality of binning pixels may be defined to include two or more pixels adjacent to each other among a plurality of pixels included in a pixel array of the image sensor. In an embodiment, the image sensor may simultaneously drive the two or more pixels included in each of the plurality of binning pixels to acquire the binning pixel data from each of the binning pixels. The binning pixel data may be N bits of data (N is a natural number of 2 or more) output by a readout circuit of the image sensor, and may have the same number of bits as pixel data acquired from each pixel by the readout circuit in a state in which binning setting is deactivated.

The image sensor may generate a plurality of image frames at a second frames per second using the binning pixel data, and may store the plurality of image frames in a memory (S41). The memory may be implemented as a DRAM, an SRAM, or the like, and, depending on an embodiment, may be implemented as a resistive memory such as an RRAM, a PRAM, an FeRAM, or the like.

The image sensor may convert binning pixel data into a log scale value in each of the plurality of image frames stored in the memory (S42). The image sensor may calculate a difference of log scale value corresponding to each of the binning pixels in a pair of frames, which are consecutive (S43).

For example, when the second image data includes a first frame and a second frame, which are consecutive, the image sensor may calculate a difference between a log scale value obtained by converting binning pixel data of a first binning pixel of the first frame, and a log scale value obtained by converting binning pixel data of a first binning pixel of the second frame. An operation, as above, may be applied to each of the binning pixels, and the difference of log scale values may be calculated and compared with a threshold value (S44).

By comparing the difference of log scale value and the threshold value, the image sensor may select a binning pixel in which an event occurs, among binning pixels included in each of the plurality of frames. For example, a binning pixel in which the difference of log scale value is greater than the threshold value may be determined as a binning pixel in which the event has occurred, and a binning pixel in which the difference of log scale value is less than the threshold value may be determined as a binning pixel in which the event has not occurred.

The image sensor may assign different values to a binning pixel in which the difference of log scale value is greater than the threshold value and a binning pixel in which the difference of log scale value is less than the threshold value, to generate second image data at a second frames per second (S45). For example, a first digital value may be assigned to a binning pixel of which log scale value difference is greater than the threshold value, and a second digital value, complementary to the first digital value, may be assigned to a binning pixel of which log scale value difference is less than the threshold value. According to the above-described operations, as above, an event-based image, rather than a general two-dimensional image, may be generated from a plurality of binning pixels. Therefore, each of the plurality of frames included in the second image data may be generated as the event-based image.

Characteristics of each of the plurality of frames included in the second image data may be changed, depending on the threshold value applied in S44. For example, when the threshold value is reduced, the number of binning pixels in which occurrence of an event is recognized may increase, and impact of noise may increase. When the threshold value increases, impact of noise may be reduced, but the number of binning pixels in which occurrence of an event is recognized may decrease, not to accurately track an outline or movement of a subject in an event-based image. Therefore, selecting an appropriate threshold value may be important.

After generating first image data in a high resolution and a low frames per second, the image sensor may generate second image data including frames as event-based images, as in the embodiment described with reference to FIG. 16. Therefore, in frame units, the second image data may have a relatively small data size, as compared to the first image data. The processor may up-convert the frames per second of the first image data with reference to the second image data, and may generate a high-quality resultant image in a high resolution and a high frames per second.

Figures 17, 18:
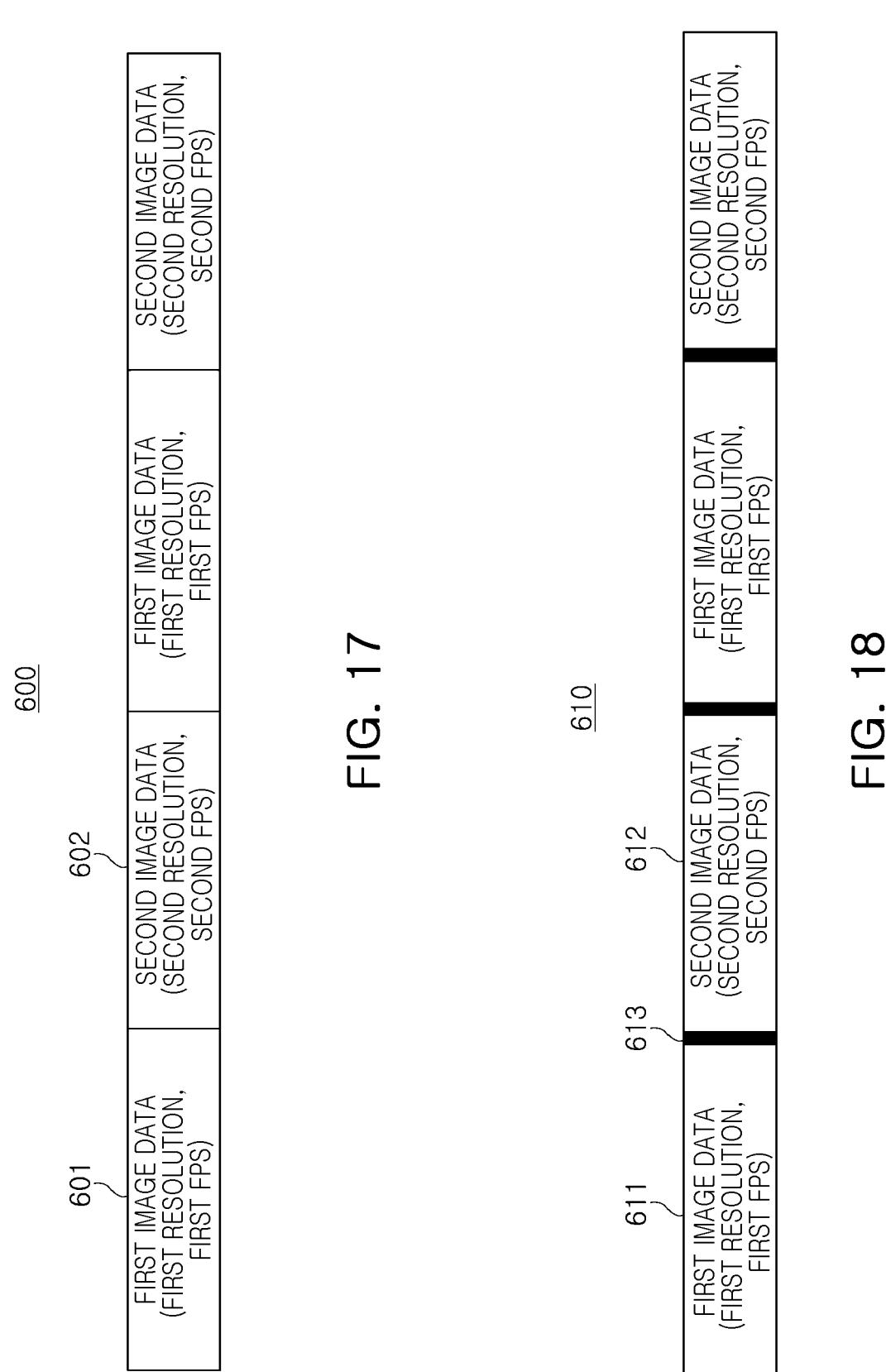
FIGS. 17 and 18 are views illustrating output data of an image sensor according to one or more example embodiments.

FIGS. 17 and 18 are views illustrating output data of an image sensor according to one or more example embodiments.

Referring to FIG. 17, output data 600 output from an image sensor and transmitted to a processor may include first image data 601 and second image data 602. In an embodiment, the first image data 601 and the second image data 602 may be output alternately. A plurality of first frames included in the first image data 601 may have a first resolution, respectively, and the plurality of first frames may be generated at a first frames per second. Data corresponding to one pixel in each of the plurality of first frames may be N bits or more of data, for example, 8 bits or more of data.

The second image data 602 may include a plurality of second frames, and each of the plurality of second frames may have a second resolution, lower than the first resolution. Each of the plurality of second frames may be an event-based image generated according to the method described above with reference to FIG. 16, or the like, and therefore data corresponding to one pixel in each of the plurality of second frames may be data smaller than N bits, for example, 1 or 2 bits of data.

The plurality of second frames may be generated at a second frames per second, faster than the first frames per second. For example, the first frames per second may be 60 fps, and the second frames per second may be 960 fps. For example, a first exposure time set to generate each of the plurality of first frames may be longer than a second exposure time set to generate each of the plurality of second frames.

A difference between the first resolution and the second resolution may be changed, depending on a binning operation performed earlier than generating the second image data 602. For example, when one binning pixel is defined by 16 pixels arranged adjacent to each other in a 4×4 form, the first resolution may be 16 times the second resolution.

The processor may increase the frames per second of the first image data 601 from the first frames per second to the second frames per second with reference to the second image data 602. For example, the frames per second of the first image data that are output by the image sensor immediately before the second image data 602 may be increased with reference to the second image data 602.

Depending on an interface connecting the image sensor and the processor, it may be impossible for the image sensor to transmit image data including frames generated at the first resolution and the second frames per second to the processor. In an embodiment, when the image sensor transmits, to the processor, first image data having a high resolution but a low frames per second, and second image data having a low resolution but a high frames per second and sufficient to track movement of a subject, the processor may increase the frames per second of the first image data with reference to the second image data to generate a resultant image. Therefore, regardless of a data transfer rate between the image sensor and the processor, a high-quality resultant image having a high resolution and a high frames per second may be produced.

Referring to FIG. 18, output data 610 transmitted from an image sensor to a processor may include first image data 611 and second image data 612. In an embodiment, the first image data 611 and the second image data 612 may be output alternately, and additional image data 613 output therebetween. The first image data 611 and the second image data 612 may be similar to the first image data 601 and the second image data 602, described above with reference to FIG. 17.

The additional image data 613 may be one frame. The additional image data 613 may have the same resolution as the second image data, and may be generated at the same first frames per second as the first image data 611. The additional image data 613 may be a general two-dimensional image of a subject, rather than an event-based image.

Figure 19:
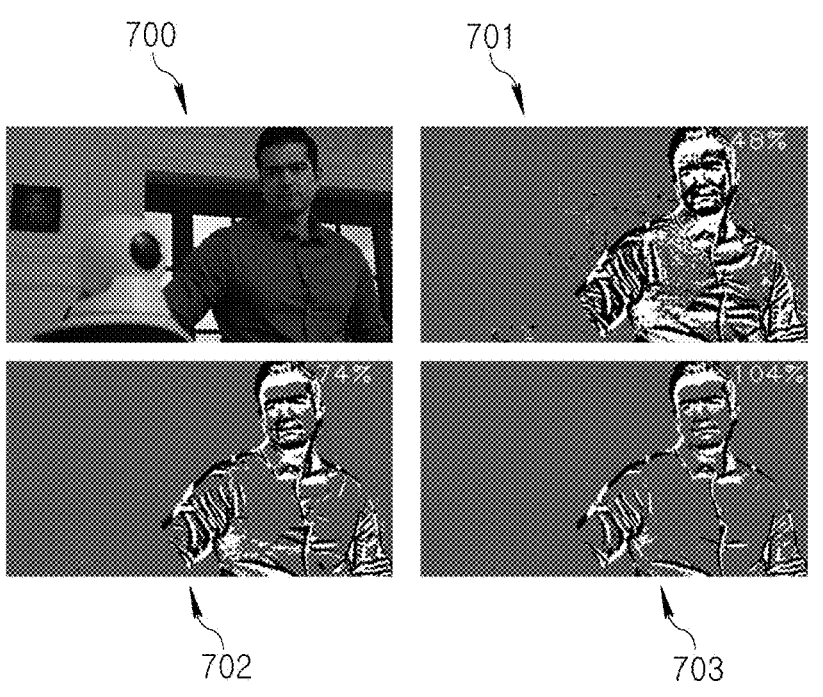
FIGS. 19 and 20 are views illustrating an operation of an electronic device according to one or more example embodiments.
Figure 20:
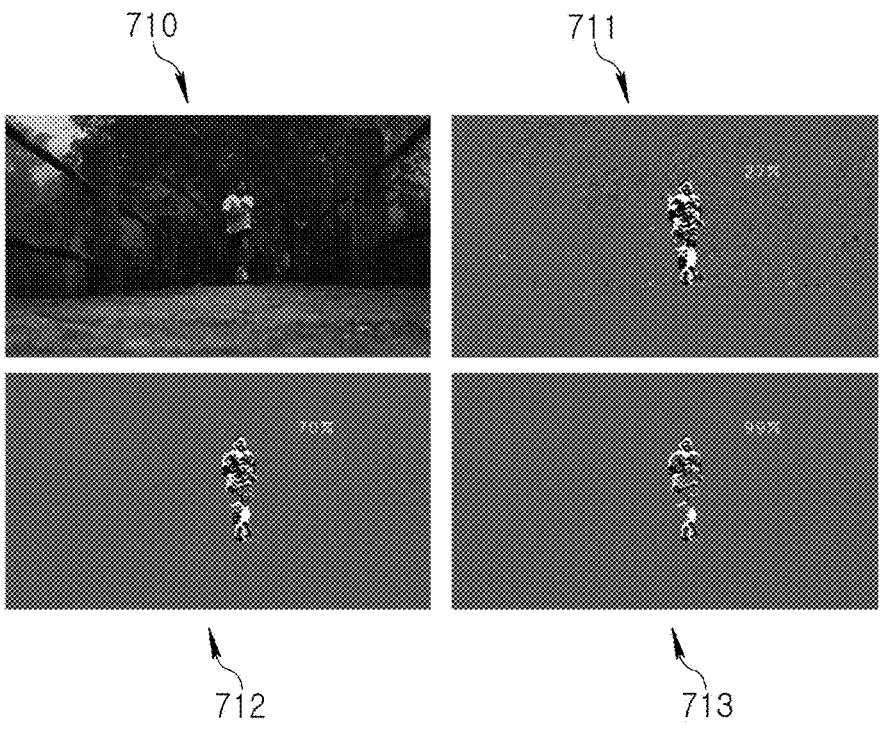

FIGS. 19 and 20 are views illustrating an operation of an electronic device according to one or more example embodiments.

In example embodiments illustrated in FIGS. 19 and 20, a first image 700 and 710 may be an original image obtained by imaging a subject with an image sensor, and second to fourth images 701 to 703, and 711 to 713 may be event-based images generated from the original image 700 and 710, respectively. For example, pixel data respectively corresponding to pixels in the original images 700 and 710 may be converted to a log scale value, a difference of log scale value obtained by converting pixel data of an immediately preceding frame of the original images 700 and 710 may be calculated, and the calculated difference may be compared with a threshold value, to generate the event-based images 701 to 703, and 711 to 713.

As illustrated in FIGS. 19 and 20, first to third event-based images 701 to 703, and 711 to 713 may be each generated by comparing the difference calculated for the log scale value with different threshold values. First, referring to FIG. 19, a first threshold value applied to a first event-based image 701 may be 48%, a second threshold value applied to a second event-based image 702 may be 74%, and a third threshold value applied to a third event-based image 703 may be 104%. Next, referring to FIG. 20, a first threshold value applied to a first event-based image 711 may be 27%, a second threshold value applied to a second event-based image 712 may be 70%, and a third threshold value applied to a third event-based image 713 may be 99%.

As explained with reference to FIGS. 19 and 20, as the threshold values increase, influence of noise may decrease, but contrast of edges representing an outline of the subject may also decrease, such that the subject may not be accurately recognized. As the threshold value decreases, influence of noise may increase such that edges representing an outline of the subject may not be accurately identified. An appropriate threshold value may be changed depending on the subject and a background, and an optimal threshold value may be determined according to the subject and the background.

Figure 21:
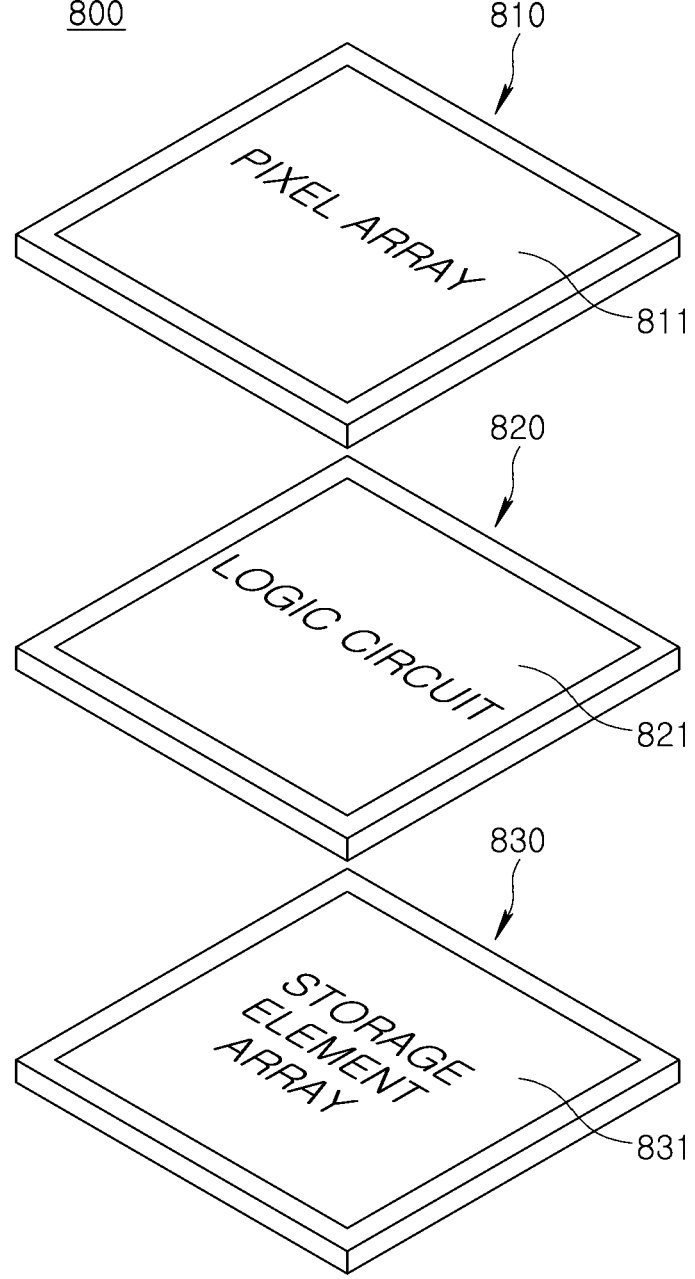
FIG. 21 is a view schematically illustrating an image sensor according to one or more example embodiments.

FIG. 21 is a view schematically illustrating an image sensor according to one or more example embodiments.

Referring to FIG. 21, an image sensor 800 may include a first layer 810, a second layer 820, and a third layer 830, stacked in order. The first layer 810 may include a pixel array 811, and the second layer 820 may include a logic circuit 821. The pixel array 811 may be connected to the logic circuit 821 through a plurality of row lines and a plurality of column lines.

The third layer 830 may include a storage element array 831, and a memory such as a DRAM, an SRAM, an FeRAM, an RRAM, a PRAM, or the like may be disposed in the storage element array 831. A circuit for controlling the memory may be disposed, together with the storage element array 831, in the third layer 830, or the circuit for controlling the memory may be disposed, together with the logic circuit 821, in the second layer 820.

The logic circuit 821 may acquire pixel data from pixels arranged in the pixel array 811 in a state in which binning setting is deactivated, to generate first image data. Additionally, the logic circuit 821 may activate the binning setting to define binning pixels using pixels of the pixel array 811, and may use binning pixel data obtained from the binning pixels, to generate second image data.

The logic circuit 821 may reduce a size of the binning pixel data to generate second image data. For example, the logic circuit 821 may acquire the binning pixel data while driving the pixel array 811 at a high frames per second to generate a plurality of frames, and the binning pixel data constituting the plurality of frames may be first stored in the storage element array 831. The logic circuit 821 may convert the binning pixel data stored in the storage element array 831 into a log scale value.

The logic circuit 821 may calculate a difference in a pair of log scale values corresponding to a pair of binning pixels included in a pair of consecutive frames among the plurality of frames, and may compare the difference with a threshold value to generate the second image data having a small size. For example, when the calculated difference is greater than the threshold value, a pixel value of a binning pixel corresponding thereto may be defined as '1,' and when the calculated difference is less than the threshold value, a pixel value of a binning pixel corresponding thereto may be defined as '0.' Through this operation, data of each binning pixel may be reduced to 1 bit in each of the plurality of frames included in the second image data. Therefore, the image sensor 800 may output second image data having a high frames per second to an external processor.

Figure 22:
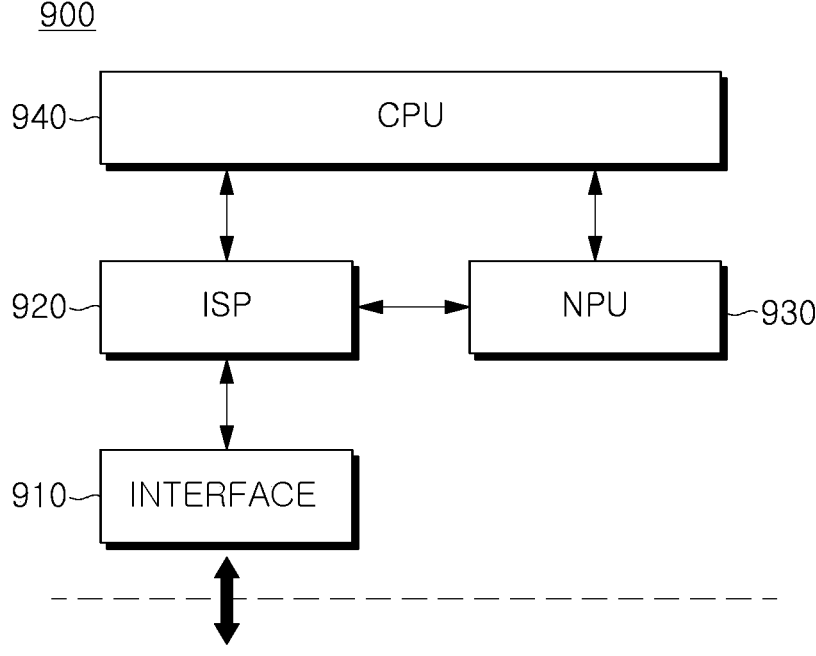
FIG. 22 is a view schematically illustrating a processor connected to an image sensor according to one or more example embodiments.

FIG. 22 is a view schematically illustrating a processor connected to an image sensor according to one or more example embodiments.

Referring to FIG. 22, a processor 900 according to an embodiment may include an interface 910 configured to receive image data from an image sensor located externally, an image signal processor 920 configured to process the image data to generate a resultant image, a neural processor unit 930, a central processing unit 940, and the like. In an embodiment, the interface 910 may receive the image data from the image sensor in a communication manner according to a mobile industry processor interface (MIPI) standard.

Depending on an operation mode of the image sensor, the interface 910 may receive image data having different numbers of frames per second and resolutions. For example, the interface 910 may receive first image data having a high resolution and a low frames per second, and second image data having a low resolution and a high frames per second, from the image sensor. In an embodiment, the interface 910 may include a first interface and a second interface, different from the first interface. The image sensor may output the first image data through the first interface, and output the second image data through the second interface.

When the image sensor operates in a capture mode, the image signal processor 920 may generate a motion vector representing movement of a subject from the second image data, and may perform deblurring on the first image data using the motion vector. When the image sensor operates in a video mode, the image signal processor 920 may up-convert the frames per second of the first image data using the second image data. For example, to up-convert the frames per second of the first image data, the image signal processor 920 may use the neural processing unit 930.

Figure 23:
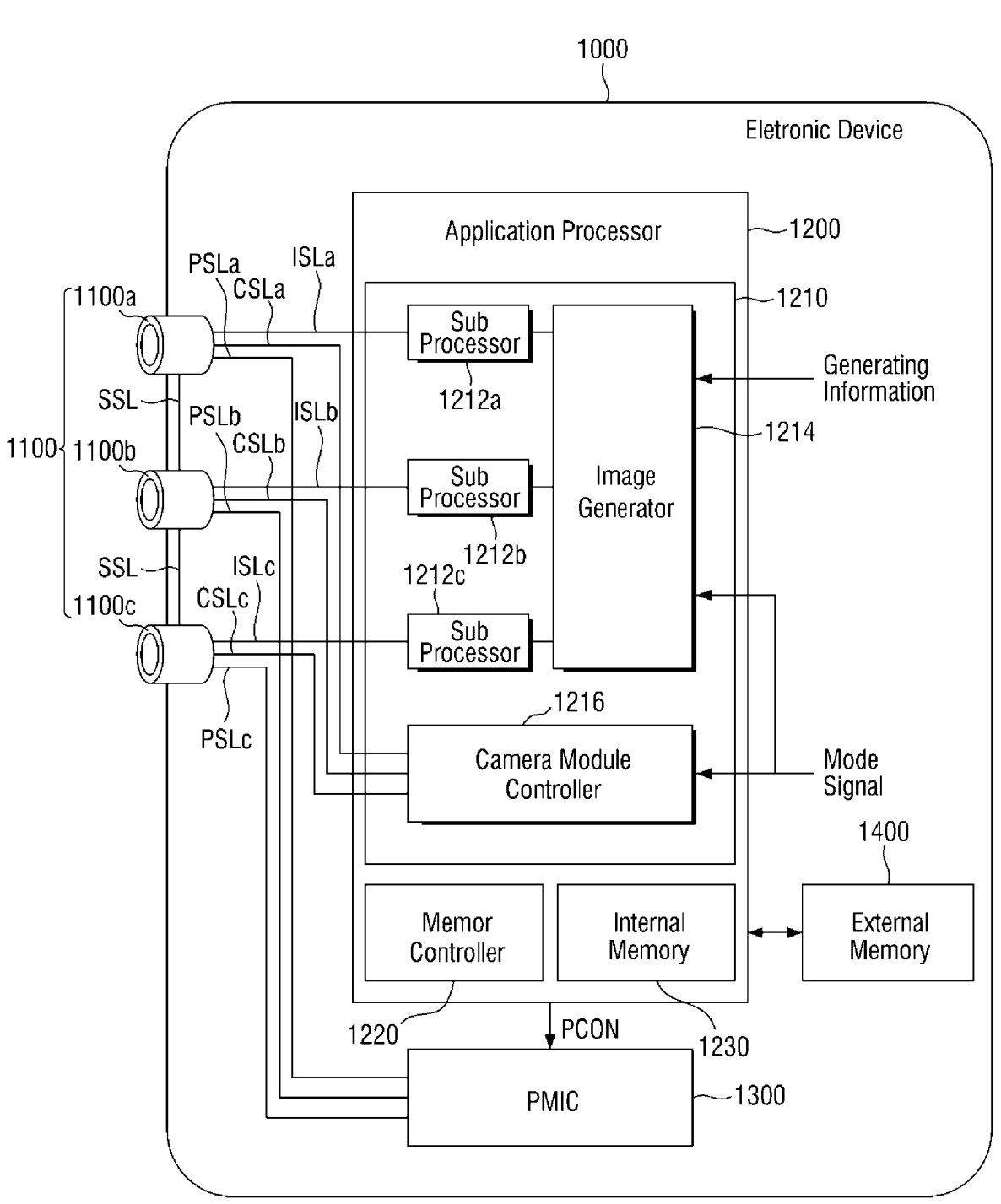
FIG. 23 is a view schematically illustrating an electronic device including an image sensor according to one or more example embodiments.

FIG. 23 is a view schematically illustrating an electronic device including an image sensor according to one or more example embodiments.

Referring to FIG. 23, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. In an embodiment illustrated in FIG. 23, although it is illustrated that three (3) camera modules 1100a, 1100b, and 1100c are arranged, the embodiment is not limited thereto. In some embodiments, the camera module group 1100 may be modified to include only two (2) camera modules. In some embodiments, the camera module group 1100 may be modified to include n camera modules (where n is a natural number of 4 or more). In an embodiment, at least one of the plurality of camera modules 1100a, 1100b, and 1100c included in the camera module group 1100 may include an image sensor according to one of the one or more example embodiments described above with reference to FIGS. 1 to 21.

In an embodiment, at least two camera modules (e.g., 1100a, 1100b) among the plurality of camera modules 1100a, 1100b, and 1100c may have different fields of view (or angles of view). In this case, for example, optical lenses of at least two camera modules (e.g., 1100a and 1100b) among the plurality of camera modules 1100a, 1100b, and 1100c may be different from each other, but the disclosure is not limited thereto.

In some embodiments, angles of view of each of the plurality of camera modules 1100a, 1100b, and 1100c may be different. In this case, optical lenses included in each of the plurality of camera modules 1100a, 1100b, and 1100c may also be different from each other, but the disclosure is not limited thereto.

In some embodiments, each of the plurality of camera modules 1100a, 1100b, and 1100c may be arranged to be physically separated from each other. For example, rather than dividing a sensing region of one image sensor into the plurality of camera modules 1100a, 1100b, and 1100c, independent image sensors may be disposed inside each of the plurality of camera modules 1100a, 1100b, and 1100c.

Referring to FIG. 23, the application processor 1200 may include an image signal processor 1210, a memory controller 1220, an internal memory 1230, and the like. The application processor 1200 may be implemented to be separated from the plurality of camera modules 1100a, 1100b, and 1100c. For example, the application processor 1200 and the plurality of camera modules 1100a, 1100b, and 1100c may be implemented to be separated from each other, as separate semiconductor chips.

The image signal processor 1210 may include a plurality of sub-processors 1212a, 1212b, and 1212c, an image generator 1214, and a camera module controller 1216. The image signal processor 1210 may include the plurality of sub-processors 1212a, 1212b, and 1212c, corresponding to the number of camera modules 1100a, 1100b, and 1100c.

Image data generated from each of the camera modules 1100a, 1100b, and 1100c may be provided to the corresponding sub-image processors 1212a, 1212b, and 1212c through image signal lines ISLa, ISLb, and ISLc, separated from each other. For example, image data generated from a first camera module 1100a may be provided to a first sub-processor 1212a through a first image signal line ISLa, image data generated from a second camera module 1100b may be provided to a second sub-processor 1212b through a second image signal line ISLb, and image data generated from a third camera module 1100c may be provided to a third sub-processor 1212c through a third image signal line ISLc. Transmission of such image data may be performed using, for example, a camera serial interface (CSI) based on a mobile industry processor interface (MIPI), but embodiments are not limited thereto.

In an embodiment, a sub-processor may be disposed to correspond to two or more camera modules. For example, the first sub-processor 1212a and the third sub-processor 1212c may not be implemented to be separated from each other, as illustrated, but may be implemented to be integrated into a single sub-image processor, and image data provided from the camera module 1100a and the camera module 1100c may be selected by a select element (e.g., a multiplexer) or the like, and may be then provided to the integrated sub-image processor.

Image data provided to each of the sub-processors 1212a, 1212b, and 1212c may be provided to the image generator 1214. The image generator 1214 may use the image data provided from each of the sub-processors 1212a, 1212b, and 1212c, according to image generation information or a mode signal, to generate an output image.

In an embodiment, the image generator 1214 may merge at least portion of the image data generated from the camera modules 1100a, 1100b, and 1100c having different angles of view, according to image generation information or a mode signal, to generate an output image. In addition, the image generator 1214 may generate an output image by selecting any one of image data generated from camera modules 1100a, 1100b, and 1100c having different angles of view according to image generation information or a mode signal.

In an embodiment, the image generation information may include a zoom signal or a zoom factor. Further, in an embodiment, the mode signal may be, for example, a signal based on a mode selected by a user.

When the image generation information is a zoom signal (e.g., a zoom factor) and each of the camera modules 1100a, 1100b, and 1100c has different fields of view (e.g., angles of view), the image generator 1214 may operate differently according to a type of the zoom signal. For example, when the zoom signal is a first signal, after merging image data output from the camera module 1100a and image data output from the camera module 1100c, the merged image signal and image data output from the camera module 1100b, not used in the merging, may be used to generate an output image. When the zoom signal is a second signal, different from the first signal, the image generator 1214 may not perform such image data merging, and may select any one of the image data output from each of the camera module 1100a, 1100b, and 1100c, to create an output image. Embodiments are not limited thereto, and a method of processing image data may be modified and performed as needed.

In an embodiment, the image generator 1214 may receive a plurality of pieces of image data having different exposure times from at least one sub-image processor, among the plurality of sub-image processors 1212a, 1212b, and 1212c, and may process high dynamic range (HDR) with respect to the plurality of pieces of image data, to generate merged image data having an increased dynamic range.

The camera module controller 1216 may provide a control signal to each of the camera modules 1100a, 1100b, and 1100c. The control signal generated from the camera module controller 1216 may be provided to the corresponding camera modules 1100a, 1100b, and 1100c through control signal lines CSLa, CSLb, and CSLc, separated from each other.

Any one of the plurality of camera modules 1100a, 1100b, and 1100c may be designated as a master camera (for example, 1100b), according to image generation information including a zoom signal, or a mode signal, and remaining camera modules (for example, 1100a and 1100c) may be designated as slave cameras. Such information may be included in the control signal, and may be provided to the corresponding camera modules 1100a, 1100b, and 1100c through the control signal lines CSLa, CSLb, and CSLc, separated from each other.

Camera modules operating as masters and slaves may be changed according to a zoom factor or an operation mode signal. For example, when an angle of view of the camera module 1100a is wider than an angle of view of the camera module 1100b and the zoom factor indicates a low zoom magnification, the camera module 1100b may operate as a master, and the camera module 1100a may operate as a slave. When the zoom factor indicates a high zoom magnification, the camera module 1100a may operate as a master and the camera module 1100b may operate as a slave.

In some embodiments, a control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b receiving such a sync enable signal may generate a sync signal based on the sync enable signal, and may transmit the generated sync signal to the camera modules 1100a and 1100c through a sync signal line SSL. The camera module 1100b and the camera modules 1100*a* and 1100*c* may be synchronized with the sync signal, to transmit image data to the application processor 1200.

In some embodiments, a control signal provided from the camera module controller 1216 to the plurality of camera modules 1100*a*, 1100*b*, and 1100*c* may include mode information according to a mode signal. Based on this mode information, the plurality of camera modules 1100*a*, 1100*b*, and 1100*c* may operate in a first operation mode and a second operation mode in relation to a sensation rate.

At least one of the plurality of camera modules 1100*a*, 1100*b*, and 1100*c* may generate first image data at a first resolution and a first frames per second, and second image data at a second resolution and a second frames per second, in the first operation mode. The first resolution may be higher than the second resolution, and the first frames per second may be lower than the second frames per second.

A pixel value corresponding to each pixel in an individual frame included in the first image data may be RGB data, and a pixel value corresponding to each pixel in an individual frame of the second image data may be event data. The number of bits of the RGB data may be larger than the number of bits of the event data. Additionally, due to binning setting, a size of each pixel included in an individual frame of the first image data may be smaller than a size of each pixel included in an individual frame of the second image data. As such, in an embodiment, the first image data including the RGB data and the second image data including the event data may be generated using an image sensor including pixels of the same type.

The sub-processors 1212*a*, 1212*b*, and 1212*c* of the application processor 1200 and the image generator 1214 may perform deblurring on the first image data using the second image data, or increase the frames per second of the first image data, to generate a resultant image.

The PMIC 1300 may supply power, for example, a power voltage to each of the plurality of camera modules 1100*a*, 1100*b*, and 1100*c*. For example, under control of the application processor 1200, the PMIC 1300 may supply first power to the camera module 1100*a* through a power signal line PSLa, may supply second power to the camera module 1100*b* through a power signal line PSLb, and may supply third power to the camera module 1100*c* through a power signal line PSLc.

The PMIC 1300 may generate power, corresponding to each of the plurality of camera modules 1100*a*, 1100*b*, and 1100*c*, in response to a power control signal PCON from the application processor 1200, and may also adjust a level of the power. The power control signal PCON may include a power adjustment signal for each operation mode of the plurality of camera modules 1100*a*, 1100*b*, and 1100*c*. For example, the operation mode may include a low power mode. In this case, the power control signal PCON may include information on a camera module operating in the low power mode and a level of the power to be set. The levels of pieces of power provided to each of the plurality of camera modules 1100*a*, 1100*b*, and 1100*c* may be the same or different from each other. Also, the level of power may be dynamically changed.

According to an embodiment, a logic circuit of an image sensor may acquire first image data having a first resolution from pixels arranged in a pixel array, and may acquire second image data having a second resolution, lower than the first resolution, from binning pixels binning two or more pixels adjacent to each other. An exposure time of each of the binning pixels may be set to be shorter than an exposure time of each of the pixels, and thus the frames per second of the second image data may be higher than the frames per second of the first image data. The second image data may be used to track movement of a subject included in the first image data to compensate for shaking of the subject in the first image data, or the frames per second of the first image data may be up-converted using the second image data, to generate a high-quality video.

Various advantages and effects of the disclosure are not limited to the above-described contents, and may be more easily understood in the course of describing example embodiments of the disclosure.

While example embodiments have been illustrated and described above, it will be apparent to those skilled in the art that modifications and variations could be made without departing from the scope of the disclosure as defined by the appended claims.

What is claimed is:

1. An image sensor comprising:
a pixel array including a plurality of pixels arranged in a first direction and in a second direction, the second direction intersecting the first direction; and
a logic circuit configured to drive the plurality of pixels,
wherein the logic circuit is further configured to:
generate, based on pixel data corresponding to each of the plurality of pixels, first image data having a first resolution,
after generating the first image data, generate second image data having a second resolution based on binning pixel data corresponding to each of a plurality of binning pixels, the plurality of binning pixels binning two or more pixels adjacent to each other, among the plurality of pixels, the second resolution being lower than the first resolution; and
output the first image data and the second image data,
wherein a first frames per second of the first image data is lower than a second frames per second of the second image data,
wherein a first time period at which the first image data is output and a second time period at which the second image data is output are alternately repeated, and
wherein the logic circuit is further configured to output one image frame between the first time period and the second time period, alternately repeated, the one image frame having the second resolution.

2. The image sensor of claim 1, wherein each of the plurality of binning pixels corresponds to pixels adjacent to each other in an M×M (M being a natural number of 2 or greater) arrangement among the plurality of pixels.

3. The image sensor of claim 1, wherein the one image frame is generated at a rate corresponding to the first frames per second.

4. The image sensor of claim 1, further comprising:
a memory configured to store the binning pixel data corresponding to an intensity of a light incident on each of the plurality of binning pixels and generated at the second frames per second,
wherein the logic circuit is further configured to obtain a difference between a pair of the binning pixel data corresponding to each of the plurality of binning pixels in a pair of consecutive frames, to generate the second image data.

5. The image sensor of claim 4, wherein the logic circuit is further configured to convert the binning pixel data corresponding to each of the plurality of binning pixels into a log scale value, and obtain a difference of the log scale value corresponding to each of the plurality of binning pixels in the pair of consecutive frames, to generate the second image data.

6. The image sensor of claim 5, wherein the logic circuit is further configured to compare the difference of the log scale value with a predetermined threshold value to generate the second image data.

7. The image sensor of claim 6, wherein the logic circuit is further configured to, for each of the plurality of binning pixels, set a pixel value as a first logic value based on the difference of the log scale value being greater than the predetermined threshold value, and set the pixel value as a second logic value based on the difference of the log scale value being less than the predetermined threshold value, and
wherein the first logic value and the second logic value are complementary to each other.

8. The image sensor of claim 1, wherein the logic circuit is further configured to set an exposure time of each of the plurality of pixels to be longer than an exposure time of each of the plurality of binning pixels.

9. The image sensor of claim 1, wherein the logic circuit is further configured to, before generating the first image data, generate third image data having the second resolution at the second frames per second, and
wherein the logic circuit is further configured to sequentially output the third image data, the first image data, and the second image data.

10. An image sensor comprising:
a pixel array including a plurality of pixels arranged in a first direction and in a second direction, the second direction intersecting the first direction; and
a logic circuit configured to:
generate first image data having a first resolution based on the plurality of pixels;
generate a plurality of second image data having a second resolution based on a plurality of binning pixels;
generate third image data having the first resolution based on the plurality of pixels;
output the first image data;
output the plurality of second image data after outputting the first image data; and
output the third image data after outputting the plurality of second image data,
wherein a first frames per second of the first image data is lower than a second frames per second of the plurality of second image data,
wherein the second resolution is lower than the first resolution,
wherein a first time period at which the first image data is output and a second time period at which the plurality of second image data is output are alternately repeated, and
wherein the logic circuit is further configured to output one image frame between the first time period and the second time period, alternately repeated, the one image frame having the second resolution.

11. The image sensor of claim 10, wherein each of the plurality of binning pixels corresponds to pixels adjacent to each other in an M×M (M being a natural number of 2 or greater) arrangement among the plurality of pixels.

12. The image sensor of claim 10, wherein the first image data is RGB data and the plurality of second image data is black and white image data.

13. The image sensor of claim 12, wherein the plurality of second image data comprises more than 10 second image data frames.

14. The image sensor of claim 12, wherein each of the plurality of binning pixels corresponds to more than 8 pixels.

15. The image sensor of claim 12, wherein the image imager sensor is configured to output the first image data and the plurality of second image data through the same interface.

16. The image sensor of claim 15, wherein the same interface is a mobile industry processor interface (MIPI) interface.

17. The image sensor of claim 12, wherein the image sensor is configured to output the first image data and the third image data through a first interface, and
wherein the image sensor is configured to output the plurality of second image data through a second interface different from the first interface.

18. An image sensor comprising:
a pixel array including a plurality of pixels arranged in a first direction and in a second direction, the second direction intersecting the first direction; and
a logic circuit configured to:
generate first image data having a first resolution based on the plurality of pixels; and
generate a plurality of second image data having a second resolution based on a plurality of binning pixels;
wherein the second resolution is lower than the first resolution,
wherein the first image data is RGB data and the plurality of second image data is black and white image data,
wherein a first time period at which the first image data is output and a second time period at which the plurality of second image data is output are alternately repeated, and
wherein the logic circuit is further configured to output one image frame between the first time period and the second time period, alternately repeated, the one image frame having the second resolution.

* * * * *